US012518705B2

(12) United States Patent
Chung

(10) Patent No.: US 12,518,705 B2
(45) Date of Patent: Jan. 6, 2026

(54) GATE DRIVER AND DISPLAY DEVICE INCLUDING THE SAME

(71) Applicant: Samsung Display Co., LTD., Yongin-si (KR)

(72) Inventor: Kyunghoon Chung, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 51 days.

(21) Appl. No.: 18/435,433

(22) Filed: Feb. 7, 2024

(65) Prior Publication Data

US 2024/0321214 A1 Sep. 26, 2024

(30) Foreign Application Priority Data

Mar. 22, 2023 (KR) ........................ 10-2023-0037387

(51) Int. Cl.
*G09G 3/3266* (2016.01)
*G09G 3/32* (2016.01)

(52) U.S. Cl.
CPC ............. *G09G 3/3266* (2013.01); *G09G 3/32* (2013.01); *G09G 2300/0426* (2013.01); *G09G 2310/0267* (2013.01); *G09G 2310/0291* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 9,013,391 B2 * | 4/2015 | Fujikawa | H03K 3/015 | 345/204 |
| 2010/0007649 A1 * | 1/2010 | Tanikame | G09G 3/3291 | 345/76 |
| 2015/0170568 A1 * | 6/2015 | Lee | G11C 19/287 | 345/77 |
| 2017/0076683 A1 * | 3/2017 | Lee | G09G 3/3266 | |
| 2017/0206840 A1 * | 7/2017 | Cho | G09G 3/3266 | |

FOREIGN PATENT DOCUMENTS

| | | |
|---|---|---|
| KR | 1020220014373 A | 2/2022 |
| KR | 1020220154316 A | 11/2022 |

* cited by examiner

Primary Examiner — Matthew Yeung
(74) *Attorney, Agent, or Firm* — CANTOR COLBURN LLP

(57) ABSTRACT

A gate driver includes: a stage, which generates a carry signal and provides the carry signal to a next stage; and an output controller, which receives the carry signal and an enable signal, controls a voltage of a first control node in the output controller based on the carry signal or both the carry signal and the enable signal, and outputs a gate signal based on the voltage of the first control node or both the voltage of the first control node and the enable signal. The gate signal corresponds to the carry signal under a predetermined condition.

16 Claims, 24 Drawing Sheets

GATE DRIVER AND DISPLAY DEVICE INCLUDING THE SAME

This application claims priority to Korean Patent Application No. 10-2023-0037387 filed on Mar. 22, 2023, and all the benefits accruing therefrom under 35 U.S.C. § 119, the content of which in its entirety is herein incorporated by reference.

BACKGROUND

1. Field

Embodiments of the present disclosure relate to a display device. More particularly, embodiments of the present disclosure relate to a gate driver and a display device including the gate driver.

2. Description of the Related Art

In general, a display device may include a display panel, a gate driver, a data driver, and a timing controller. The display panel may include a plurality of gate lines, a plurality of data lines, and a plurality of pixels electrically connected to the gate lines and the data lines. The gate driver may provide gate signals to the gate lines, the data driver may provide data voltages to the data lines, and the timing controller may control the gate driver and the data driver.

There has been a demand to reduce power consumption of display devices. In particular, there has been a demand to reduce power consumption of display devices in mobile devices such as smart phones and tablet computers. In order to reduce the power consumption of the display devices, a low-frequency driving technology for driving or refreshing a display panel at a low frequency that is lower than a normal driving frequency of the display panel has been developed.

Meanwhile, according to a conventional display device to which the low-frequency driving technology is applied, when a still image is not displayed in an entire region of a display panel, that is, when a still image is displayed only in a partial region of the display panel, the entire region of the display panel is driven at a normal driving frequency. Therefore, in this case, low-frequency driving may not be performed, and power consumption may not be reduced.

In order to reduce power consumption even when a still image is displayed only in a partial region of the display panel, a multi-frequency driving ("MFD") technology for driving partial regions of the display panel at mutually different driving frequencies has been developed. According to a display device to which the multi-frequency driving technology is applied, a first display region in which a moving image is displayed may be driven at a normal driving frequency, and a second display region in which a still image is displayed may be driven at a low frequency that is lower than the normal driving frequency. Accordingly, power consumption may be effectively reduced even when the still image is displayed only in the second display region.

SUMMARY

An aspect of the present disclosure is to provide a gate driver capable of varying a driving frequency for each region of a display panel.

Another aspect of the present disclosure is to provide a display device including the gate driver.

However, the aspect of the present disclosure is not limited thereto. Thus, the aspect of the present disclosure may be extended without departing from the spirit and the scope of the present disclosure.

According to embodiments, a gate driver includes: a stage configured to generate a carry signal and to provide the carry signal to a next stage; and an output controller configured to receive the carry signal and an enable signal, to control a voltage of a first control node in the output controller based on the carry signal or both the carry signal and the enable signal, and to output a gate signal based on the voltage of the first control node or both the voltage of the first control node and the enable signal. The gate signal corresponds to the carry signal under a predetermined condition.

In an embodiment, the output controller may be configured to output the gate signal, which corresponds to the carry signal, when the enable signal has an activation level and to output the gate signal, which has an inactivation level, when the enable signal has the inactivation level.

In an embodiment, the output controller may include a first-first control transistor including a control electrode configured to receive the carry signal, a first electrode configured to receive a high voltage, and a second electrode connected to the first control node, a first-second control transistor including a control electrode configured to receive the enable signal, a first electrode configured to receive the high voltage, and a second electrode connected to the first control node, a second-first control transistor including a control electrode configured to receive the carry signal, a first electrode connected to a second electrode of a second-second control transistor, and a second electrode connected to the first control node, the second-second control transistor including a control electrode configured to receive the enable signal, a first electrode configured to receive a low voltage, and the second electrode connected to the first electrode of the second-first control transistor, a third control transistor including a control electrode connected to the first control node, a first electrode configured to receive the high voltage, and a second electrode connected to a second control node, through which the gate signal is output, and a fourth control transistor including a control electrode connected to the first control node, a first electrode configured to receive the low voltage, and a second electrode connected to the second control node.

In an embodiment, the output controller may include a first control transistor including a control electrode configured to receive the carry signal, a first electrode configured to receive a high voltage, and a second electrode connected to the first control node, a second control transistor including a control electrode configured to receive the carry signal, a first electrode configured to receive a low voltage, and a second electrode connected to the first control node, a third-first control transistor including a control electrode configured to receive the enable signal, a first electrode configured to receive the high voltage, and a second electrode connected to a first electrode of a third-second control transistor, the third-second control transistor including a control electrode connected to the first control node, the first electrode connected to the second electrode of the third-first control transistor, and a second electrode connected to a second control node, through which the gate signal is output, a fourth-first control transistor including a control electrode connected to the first control node, a first electrode configured to receive the low voltage, and a second electrode connected to the second control node, and a fourth-second control transistor including a control electrode configured to receive the enable signal, a first electrode configured to receive the low voltage, and a second electrode connected to the second control node.

In an embodiment, the output controller may include a first-first control transistor including a control electrode configured to receive the enable signal, a first electrode configured to receive a high voltage, and a second electrode connected to a first electrode of a first-second control transistor, the first-second control transistor including a control electrode configured to receive the carry signal, the first electrode connected to the second electrode of the first-first control transistor, and a second electrode connected to the first control node, a second-first control transistor including a control electrode configured to receive the carry signal, a first electrode configured to receive a low voltage, and a second electrode connected to the first control node, a second-second control transistor including a control electrode configured to receive the enable signal, a first electrode configured to receive the low voltage, and a second electrode connected to the first control node, a third control transistor including a control electrode connected to the first control node, a first electrode configured to receive the high voltage, and a second electrode connected to a second control node, through which the gate signal is output, and a fourth control transistor including a control electrode connected to the first control node, a first electrode configured to receive the low voltage, and a second electrode connected to the second control node.

In an embodiment, the output controller may include a first control transistor including a control electrode configured to receive the carry signal, a first electrode configured to receive a high voltage, and a second electrode connected to the first control node, a second control transistor including a control electrode configured to receive the carry signal, a first electrode configured to receive a low voltage, and a second electrode connected to the first control node, a third-first control transistor including a control electrode connected to the first control node, a first electrode configured to receive the high voltage, and a second electrode connected to a second control node, through which the gate signal is output, a third-second control transistor including a control electrode configured to receive the enable signal, a first electrode configured to receive the high voltage, and a second electrode connected to the second control node, a fourth-first control transistor including a control electrode connected to the first control node, a first electrode connected to a second electrode of a fourth-second control transistor, and a second electrode connected to the second control node, and the fourth-second control transistor including a control electrode configured to receive the enable signal, a first electrode configured to receive the low voltage, and the second electrode connected to the first electrode of the fourth-first control transistor.

In an embodiment, the gate driver may further include a buffer configured to receive and output the gate signal.

In an embodiment, the stage may include a first stage transistor including a control electrode configured to receive a first clock signal, a first electrode configured to receive an input signal, and a second electrode connected to a first stage node, a second stage transistor including a control electrode connected to a second stage node, a first electrode configured to receive a high voltage, and a second electrode connected to a third stage node, a third stage transistor including a control electrode connected to a fourth stage node, a first electrode configured to receive a second clock signal, and a second electrode connected to the third stage node, a fourth stage transistor including a control electrode connected to the first stage node, a first electrode configured to receive the first clock signal, and a second electrode connected to the second stage node, a fifth stage transistor including a control electrode configured to receive the first clock signal, a first electrode configured to receive a low voltage, and a second electrode connected to the second stage node, a sixth stage transistor including a control electrode configured to receive the second clock signal, a first electrode connected to a fifth stage node, and a second electrode connected to a sixth stage node, a seventh stage transistor including a control electrode connected to a seventh stage node, a first electrode configured to receive the second clock signal, and a second electrode connected to the fifth stage node, an eighth stage transistor including a control electrode connected to the first stage node, a first electrode configured to receive the high voltage, and a second electrode connected to the sixth stage node, a ninth stage transistor including a control electrode connected to the sixth stage node, a first electrode configured to receive the high voltage, and a second electrode connected to an eighth stage node, through which the carry signal is output, a tenth stage transistor including a control electrode connected to a ninth stage node, a first electrode configured to receive the low voltage, and a second electrode connected to the eighth stage node, an eleventh stage transistor including a control electrode configured to receive the low voltage, a first electrode connected to the second stage node, and a second electrode connected to the seventh stage node, a twelfth stage transistor including a control electrode configured to receive the low voltage, a first electrode connected to the first stage node, and a second electrode connected to the ninth stage node, a first stage capacitor including a first electrode configured to receive the high voltage and a second electrode connected to the sixth stage node, a second stage capacitor including a first electrode connected to the seventh stage node and a second electrode connected to the fifth stage node, and a third stage capacitor including a first electrode connected to the fourth stage node and a second electrode connected to the third stage node.

In an embodiment, the stage may include a first stage transistor including a control electrode configured to receive a first clock signal, a first electrode configured to receive an input signal, and a second electrode connected to a first stage node, a second stage transistor including a control electrode connected to a second stage node, a first electrode configured to receive a high voltage, and a second electrode connected to a second electrode of a third stage transistor, the third stage transistor including a control electrode configured to receive a second clock signal, a first electrode connected to the first stage node, and the second electrode connected to the second electrode of the second stage transistor, a fourth stage transistor including a control electrode connected to the first stage node, a first electrode configured to receive the first clock signal, and a second electrode connected to the second stage node, a fifth stage transistor including a control electrode configured to receive the first clock signal, a first electrode configured to receive a low voltage, and a second electrode connected to the second stage node, a sixth stage transistor including a control electrode connected to the second stage node, a first electrode configured to receive the high voltage, and a second electrode connected to a third stage node, through which the carry signal is output, a seventh stage transistor including a control electrode connected to a fourth stage node, a first electrode configured to receive the second clock signal, and a second electrode connected to the third stage node, an eighth stage transistor including a control electrode configured to receive the low voltage, a first electrode connected to the first stage node, and a second electrode connected to the fourth stage node, a first stage capacitor including a first electrode configured to receive the high voltage and a second electrode connected to the second stage node, and a second stage capacitor including a first electrode connected to the fourth stage node and a second electrode connected to the third stage node.

In an embodiment, the stage may include a first stage transistor including a control electrode configured to receive a first clock signal, a first electrode configured to receive an input signal, and a second electrode connected to a first stage node, a second stage transistor including a control electrode connected to a second stage node, a first electrode configured to receive a second clock signal, and a second electrode connected to a first electrode of a third stage capacitor, a third stage transistor including a control electrode configured to receive the first clock signal, a first electrode configured to receive a low voltage, and a second electrode connected to a third stage node, a fourth stage transistor including a control electrode configured to receive the low voltage, a first electrode connected to the third stage node, and a second electrode connected to a fourth stage node, a fifth stage transistor including a control electrode connected to the second stage node, a first electrode configured to receive the first clock signal, and a second electrode connected to the third stage node, a sixth stage transistor including a control electrode connected to the fourth stage node, a first electrode configured to receive the second clock signal, and a second electrode connected to a first electrode of a seventh stage transistor, the seventh stage transistor including a control electrode connected to the fourth stage node, the first electrode connected to the second electrode of the sixth stage transistor, and a second electrode connected to a fifth stage node, an eighth stage transistor including a control electrode configured to receive the second clock signal, a first electrode connected to the fifth stage node, and a second electrode connected to a sixth stage node, a ninth stage transistor including a control electrode connected to the sixth stage node, a first electrode configured to receive the first clock signal, and a second electrode connected to a seventh stage node, through which the carry signal is output, a tenth stage transistor including a control electrode connected to the second stage node, a first electrode configured to receive the low voltage, and a second electrode connected to the seventh stage node, an eleventh stage transistor including a control electrode configured to receive the low voltage, a first electrode connected to the first stage node, and a second electrode connected to the second stage node, a first stage capacitor including a first electrode configured to receive the first clock signal and a second electrode connected to the sixth stage node, a second stage capacitor including a first electrode connected to the fourth stage node and a second electrode connected to the fifth stage node, and the third stage capacitor including the first electrode connected to the second electrode of the second stage transistor and a second electrode connected to the second stage node.

According to embodiments, a display device includes: a display panel including pixels; a data driver configured to provide data voltages to the pixels; a gate driver including stages and output controllers; and a timing controller configured to control the data driver and the gate driver. Here, each of the stages is configured to generate a carry signal and to provide the carry signal to a next stage. In addition, each of the output controllers is configured to receive the carry signal and an enable signal, to control a voltage of a first control node in the ouput controller based on the carry signal or both the carry signal and the enable signal, and to output a gate signal to at least one of the pixels based on the voltage of the first control node or both the voltage of the first control node and the enable signal. The gate signal corresponds to the carry signal under a predetermined condition.

In an embodiment, the timing controller may be configured to control a driving frequency of a portion of the display panel by controlling the enable signal applied to each of the output controllers, which is configured to output the gate signal to the portion of the display panel.

In an embodiment, each of the output controllers may be configured to output the gate signal, which corresponds to the carry signal, when the enable signal has an activation level and to output the gate signal, which has an inactivation level when the enable signal has the inactivation level.

In an embodiment, each of the output controllers may include a first-first control transistor including a control electrode configured to receive the carry signal, a first electrode configured to receive a high voltage, and a second electrode connected to the first control node, a first-second control transistor including a control electrode configured to receive the enable signal, a first electrode configured to receive the high voltage, and a second electrode connected to the first control node, a second-first control transistor including a control electrode configured to receive the carry signal, a first electrode connected to a second electrode of a second-second control transistor, and a second electrode connected to the first control node, the second-second control transistor including a control electrode configured to receive the enable signal, a first electrode configured to receive a low voltage, and the second electrode connected to the first electrode of the second-first control transistor, a third control transistor including a control electrode connected to the first control node, a first electrode configured to receive the high voltage, and a second electrode connected to a second control node, through which the gate signal is output, and a fourth control transistor including a control electrode connected to the first control node, a first electrode configured to receive the low voltage, and a second electrode connected to the second control node.

In an embodiment, each of the output controllers may include a first control transistor including a control electrode configured to receive the carry signal, a first electrode configured to receive a high voltage, and a second electrode connected to the first control node, a second control transistor including a control electrode configured to receive the carry signal, a first electrode configured to receive a low voltage, and a second electrode connected to the first control node, a third-first control transistor including a control electrode configured to receive the enable signal, a first electrode configured to receive the high voltage, and a second electrode connected to a first electrode of a third-second control transistor, the third-second control transistor including a control electrode connected to the first control node, the first electrode connected to the second electrode of the third-first control transistor, and a second electrode connected to a second control node, through which the gate signal is output, a fourth-first control transistor including a control electrode connected to the first control node, a first electrode configured to receive the low voltage, and a second electrode connected to the second control node, and a fourth-second control transistor including a control electrode configured to receive the enable signal, a first electrode configured to receive the low voltage, and a second electrode connected to the second control node.

In an embodiment, each of the output controllers may include a first-first control transistor including a control electrode configured to receive the enable signal, a first electrode configured to receive a high voltage, and a second electrode connected to a first electrode of a first-second control transistor, the first-second control transistor including a control electrode configured to receive the carry signal, the first electrode connected to the second electrode of the first-first control transistor, and a second electrode connected to the first control node, a second-first control transistor including a control electrode configured to receive the carry signal, a first electrode configured to receive a low voltage, and a second electrode connected to the first control node, a second-second control transistor including a control electrode configured to receive the enable signal, a first electrode configured to receive the low voltage, and a second electrode connected to the first control node, a third control transistor including a control electrode connected to the first control node, a first electrode configured to receive the high voltage, and a second electrode connected to a second control node, through which the gate signal is output, and a fourth control transistor including a control electrode connected to the first control node, a first electrode configured to receive the low voltage, and a second electrode connected to the second control node.

In an embodiment, each of the output controllers may include a first control transistor including a control electrode configured to receive the carry signal, a first electrode configured to receive a high voltage, and a second electrode connected to the first control node, a second control transistor including a control electrode configured to receive the carry signal, a first electrode configured to receive a low voltage, and a second electrode connected to the first control node, a third-first control transistor including a control electrode connected to the first control node, a first electrode configured to receive the high voltage, and a second electrode connected to a second control node, through which the gate signal is output, a third-second control transistor including a control electrode configured to receive the enable signal, a first electrode configured to receive the high voltage, and a second electrode connected to the second control node, a fourth-first control transistor including a control electrode connected to the first control node, a first electrode connected to a second electrode of a fourth-second control transistor, and a second electrode connected to the second control node, and the fourth-second control transistor including a control electrode configured to receive the enable signal, a first electrode configured to receive the low voltage, and the second electrode connected to the first electrode of the fourth-first control transistor.

In an embodiment, the gate driver may further include a buffer configured to receive and output the gate signal.

In an embodiment, at least one of the stages may include a first stage transistor including a control electrode configured to receive a first clock signal, a first electrode configured to receive an input signal, and a second electrode connected to a first stage node, a second stage transistor including a control electrode connected to a second stage node, a first electrode configured to receive a high voltage, and a second electrode connected to a third stage node, a third stage transistor including a control electrode connected to a fourth stage node, a first electrode configured to receive a second clock signal, and a second electrode connected to the third stage node, a fourth stage transistor including a control electrode connected to the first stage node, a first electrode configured to receive the first clock signal, and a second electrode connected to the second stage node, a fifth stage transistor including a control electrode configured to receive the first clock signal, a first electrode configured to receive a low voltage, and a second electrode connected to the second stage node, a sixth stage transistor including a control electrode configured to receive the second clock signal, a first electrode connected to a fifth stage node, and a second electrode connected to a sixth stage node, a seventh stage transistor including a control electrode connected to a seventh stage node, a first electrode configured to receive the second clock signal, and a second electrode connected to the fifth stage node, an eighth stage transistor including a control electrode connected to the first stage node, a first electrode configured to receive the high voltage, and a second electrode connected to the sixth stage node, a ninth stage transistor including a control electrode connected to the sixth stage node, a first electrode configured to receive the high voltage, and a second electrode connected to an eighth stage node, through which the carry signal is output, a tenth stage transistor including a control electrode connected to a ninth stage node, a first electrode configured to receive the low voltage, and a second electrode connected to the eighth stage node, an eleventh stage transistor including a control electrode configured to receive the low voltage, a first electrode connected to the second stage node, and a second electrode connected to the seventh stage node, a twelfth stage transistor including a control electrode configured to receive the low voltage, a first electrode connected to the first stage node, and a second electrode connected to the ninth stage node, a first stage capacitor including a first electrode configured to receive the high voltage and a second electrode connected to the sixth stage node, a second stage capacitor including a first electrode connected to the seventh stage node and a second electrode connected to the fifth stage node, and a third stage capacitor including a first electrode connected to the fourth stage node and a second electrode connected to the third stage node.

In an embodiment, at least one of the stages may include a first stage transistor including a control electrode configured to receive a first clock signal, a first electrode configured to receive an input signal, and a second electrode connected to a first stage node, a second stage transistor including a control electrode connected to a second stage node, a first electrode configured to receive a high voltage, and a second electrode connected to a second electrode of a third stage transistor, the third stage transistor including a control electrode configured to receive a second clock signal, a first electrode connected to the first stage node, and the second electrode connected to the second electrode of the second stage transistor, a fourth stage transistor including a control electrode connected to the first stage node, a first electrode configured to receive the first clock signal, and a second electrode connected to the second stage node, a fifth stage transistor including a control electrode configured to receive the first clock signal, a first electrode configured to receive a low voltage, and a second electrode connected to the second stage node, a sixth stage transistor including a control electrode connected to the second stage node, a first electrode configured to receive the high voltage, and a second electrode connected to a third stage node, through which the carry signal is output, a seventh stage transistor including a control electrode connected to a fourth stage node, a first electrode configured to receive the second clock signal, and a second electrode connected to the third stage node, an eighth stage transistor including a control electrode configured to receive the low voltage, a first electrode connected to the first stage node, and a second electrode connected to the fourth stage node, a first stage capacitor including a first electrode configured to receive the high voltage and a second electrode connected to the second stage node, and a second stage capacitor including a first electrode connected to the fourth stage node and a second electrode connected to the third stage node.

Therefore, a gate driver according to embodiments may include an output controller configured to receive a carry signal from a stage to output a gate signal, so that driving frequencies of partial regions of a display region can be varied independently of each other.

However, the effect of the present disclosure is not limited thereto. Thus, the effect of the present disclosure may be extended without departing from the spirit and the scope of the present disclosure.

DETAILED DESCRIPTION

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. Hereinafter, embodiments of the present disclosure will be explained in detail with reference to the accompanying drawings.

Figure 1:
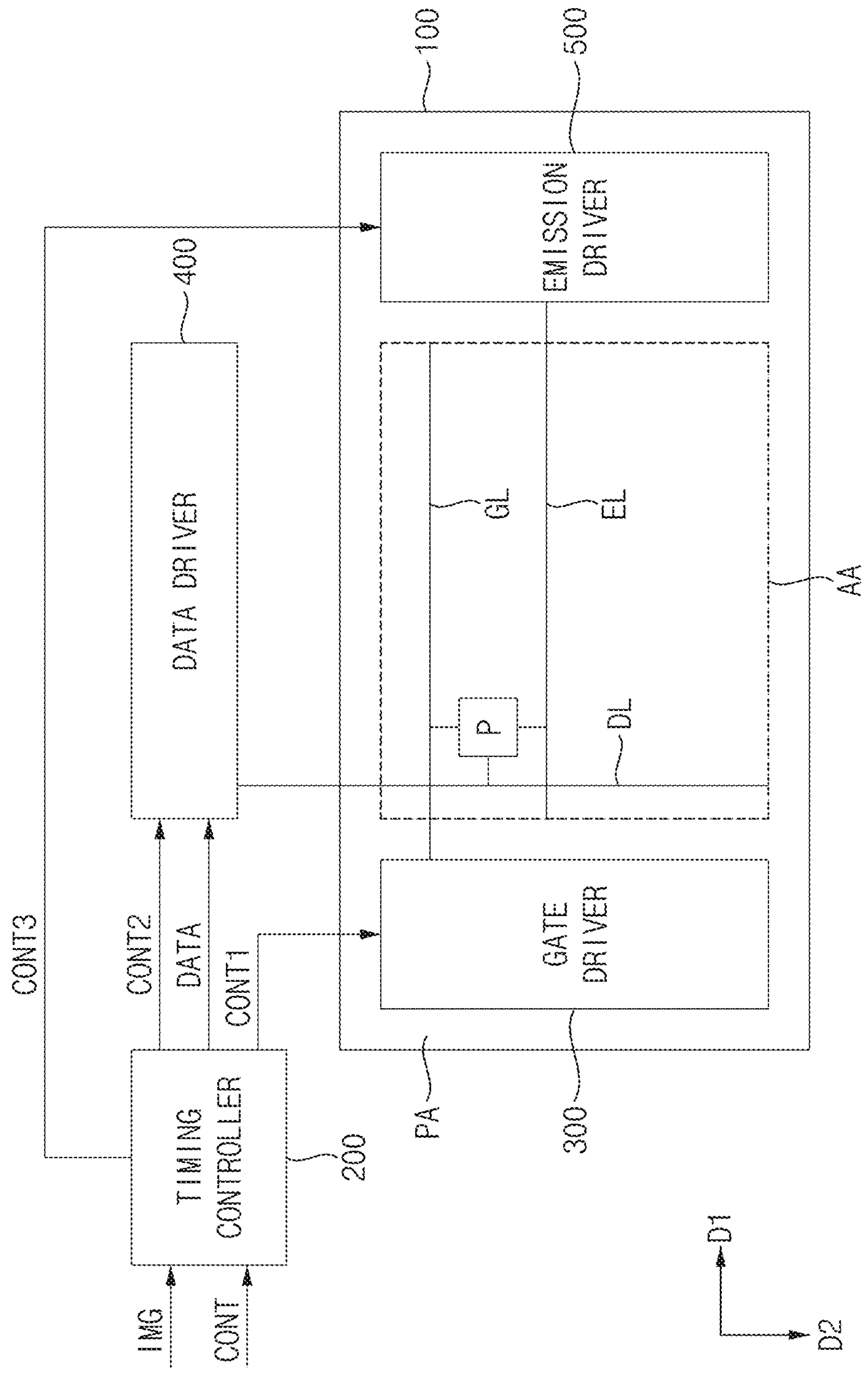
FIG. 1 is a block diagram illustrating a display device according to embodiments.

FIG. 1 is a block diagram illustrating a display device according to embodiments.

Referring to FIG. 1, a display device may include a display panel 100, a timing controller 200, a gate driver 300, a data driver 400, and an emission driver 500. In an embodiment, the timing controller 200 and the data driver 400 may be integrated on one chip.

The display panel 100 may include a display region AA in which an image is displayed, and a peripheral region PA that is adjacent to the display region AA. In an embodiment, the gate driver 300 and the emission driver 500 may be mounted in the peripheral region PA.

The display panel 100 may include a plurality of gate lines GL, a plurality of data lines DL, a plurality of emission lines EL, and a plurality of pixels P electrically connected to the gate lines GL, the data lines DL, and the emission lines EL. The gate lines GL and the emission lines EL may extend in a first direction D1, and the data lines DL may extend in a second direction D2 intersecting the first direction D1.

The timing controller 200 may receive input image data IMG and an input control signal CONT from a host processor (e.g., a graphic processing unit ("GPU"), etc.). In an embodiment, for example, the input image data IMG may include red image data, green image data, and blue image data. In an embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, a third control signal CONT3, and a data signal DATA based on the input image data IMG and the input control signal CONT.

The timing controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT to output the generated second control signal CONT2 to the data driver 400. The second control signal CONT2 may include a horizontal start signal and a load signal.

The timing controller 200 may receive the input image data IMG and the input control signal CONT to generate the data signal DATA. The timing controller 200 may output the data signal DATA to the data driver 400.

The timing controller 200 may generate the third control signal CONT3 for controlling an operation of the emission driver 500 based on the input control signal CONT to output the generated third control signal CONT3 to the emission driver 500. The third control signal CONT3 may include a vertical start signal and an emission clock signal.

The gate driver 300 may generate gate signals for driving the gate lines GL in response to the first control signal CONT1 received from the timing controller 200. The gate driver 300 may output the gate signals to the gate lines GL. In an embodiment, for example, the gate driver 300 may sequentially output the gate signals to the gate lines GL.

The data driver 400 may receive the second control signal CONT2 and the data signal DATA from the timing controller 200. The data driver 400 may generate data voltages obtained by converting the data signal DATA into an analog voltage. The data driver 400 may output the data voltages to the data lines DL.

The emission driver 500 may generate emission signals for driving the emission lines EL in response to the third control signal CONT3 received from the timing controller 200. The emission driver 500 may output the emission signals to the emission lines EL. In an embodiment, for example, the emission driver 500 may sequentially output the emission signals to the emission lines EL.

Figure 2:
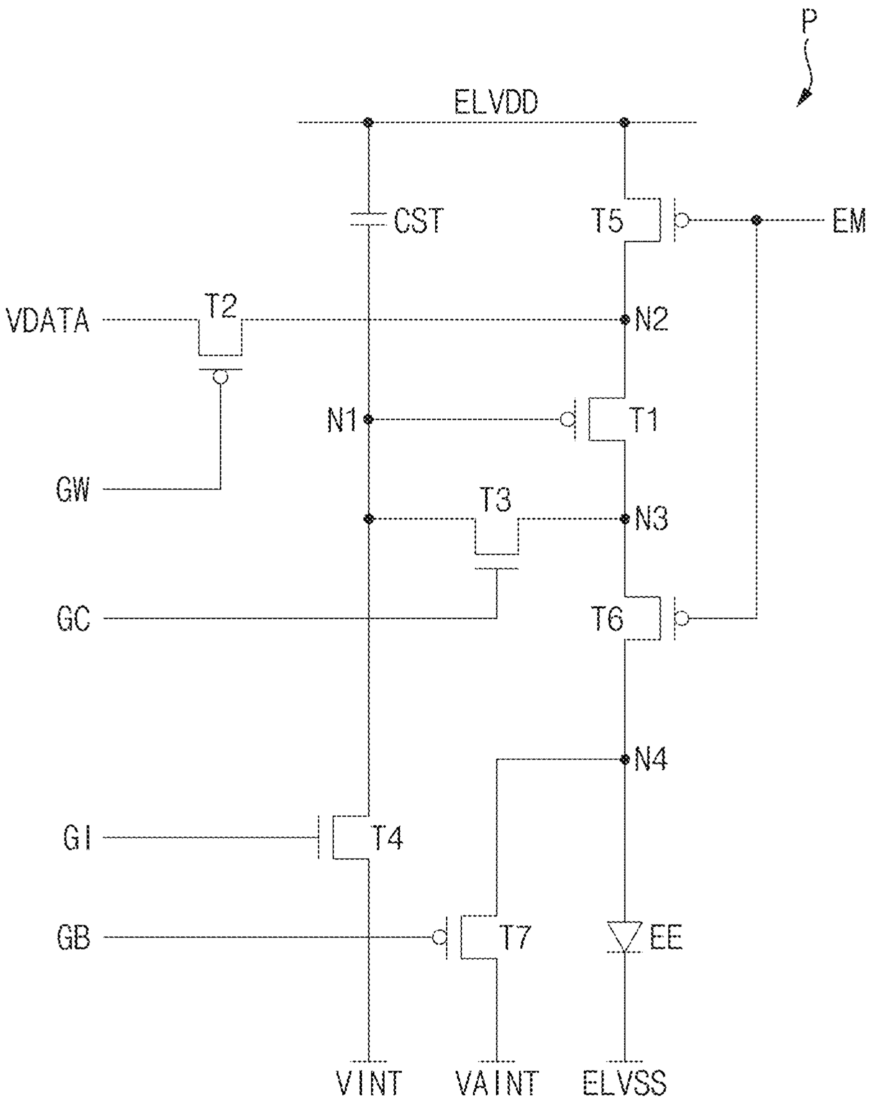
FIG. 2 is a circuit diagram illustrating an example of a pixel of the display device of FIG. 1.

FIG. 2 is a circuit diagram illustrating an example of a pixel P of the display device of FIG. 1.

Referring to FIG. 2, each of the pixels P may include: a first pixel transistor T1 (i.e., a driving pixel transistor T1) including a control electrode connected to a first pixel node N1, a first electrode connected to a second pixel node N2, and a second electrode connected to a third pixel node N3; a second pixel transistor T2 including a control electrode configured to receive a write gate signal GW, a first electrode configured to receive a data voltage VDATA, and a second electrode connected to the second pixel node N2; a third pixel transistor T3 including a control electrode configured to receive a compensation gate signal GC, a first electrode connected to the third pixel node N3, and a second electrode connected to the first pixel node N1; a fourth pixel transistor T4 including a control electrode configured to receive an initialization gate signal GI, a first electrode configured to receive a first initialization voltage VINT, and a second electrode connected to the first pixel node N1; a fifth pixel transistor T5 including a control electrode configured to receive an emission signal EM, a first electrode configured to receive a first power voltage ELVDD (e.g., a high power voltage), and a second electrode connected to the second pixel node N2; a sixth pixel transistor T6 including a control electrode configured to receive the emission signal EM, a first electrode connected to the third pixel node N3, and a second electrode connected to a fourth pixel node N4; a seventh pixel transistor T7 including a control electrode configured to receive a bias gate signal GB, a first electrode configured to receive a second initialization voltage VAINT, and a second electrode connected to the fourth pixel node N4; a storage capacitor CST including a first electrode configured to receive the first power voltage ELVDD, and a second electrode connected to the first pixel node N1; and a light emitting element EE including a first electrode (i.e., an anode electrode) connected to the fourth pixel node N4, and a second electrode configured to receive a second power voltage ELVSS (e.g., a low power voltage). However, the present disclosure is not limited thereto. For another example, each of the pixels P may have a structure such as a 3T1C structure including three transistors and one capacitor, a 5T2C structure including five transistors and two capacitors, a 7T1C structure including seven transistors and one capacitor, or a 9T1C structure including nine transistors and one capacitor.

The first, second, and fifth to seventh transistors T1, T2, T5, T6, and T7 may be implemented as p-channel metal oxide semiconductor ("PMOS") transistors. In this case, a low voltage level may be an activation level, and a high voltage level may be an inactivation level. In an embodiment, for example, when a signal applied to a control electrode of the PMOS transistor has the low voltage level, the PMOS transistor may be turned on. In an embodiment, for example, when the signal applied to the control electrode of the PMOS transistor has the high voltage level, the PMOS transistor may be turned off.

The third and fourth transistors T3 and T4 may be implemented as n-channel metal oxide semiconductor ("NMOS") transistors. In this case, a low voltage level may be an inactivation level, and a high voltage level may be an activation level. In an embodiment, for example, when a signal applied to a control electrode of the NMOS transistor has the low voltage level, the NMOS transistor may be turned off. In an embodiment, for example, when the signal applied to the control electrode of the NMOS transistor has the high voltage level, the NMOS transistor may be turned on. In other words, the activation level and the inactivation level may be determined depending on a type of the transistor.

However, the present disclosure is not limited thereto. For another example, the first, second, and fifth to seventh transistors T1, T2, T5, T6, and T7 may be implemented as NMOS transistors. In an embodiment, for example, the third and fourth transistors T3 and T4 may be implemented as PMOS transistors.

In an embodiment, for example, in an initialization period, the initialization gate signal GI may have an activation level, and the fourth pixel transistor T4 may be turned on. Accordingly, the first initialization voltage VINT may be applied to the first pixel node N1 (i.e., a gate initialization operation). In other words, the control electrode of the driving pixel transistor T1 (i.e., the storage capacitor CST) may be initialized.

In an embodiment, for example, in a data write period, the write gate signal GW and the compensation gate signal GC may have activation levels, and the second pixel transistor T2 and the third pixel transistor T3 may be turned on. Accordingly, the data voltage VDATA may be written to the storage capacitor CST (i.e., a data write operation).

In an embodiment, for example, in an anode initialization period, the bias gate signal GB may have an activation level, and the seventh pixel transistor T7 may be turned on. Accordingly, the second initialization voltage VAINT may be applied to the first electrode (i.e., the anode electrode) of the light emitting element EE (i.e., an anode initialization operation).

In an embodiment, for example, in a light emission period, the emission signal EM may have an activation level, and the fifth pixel transistor T5 and the sixth pixel transistor T6 may be turned on. Accordingly, the first power voltage ELVDD may be applied to the driving pixel transistor T1 to generate a driving current, and the driving current may be applied to the light emitting element EE (i.e., a light emission operation). In other words, the light emitting element EE may emit a light with a luminance corresponding to the driving current.

Figure 3:
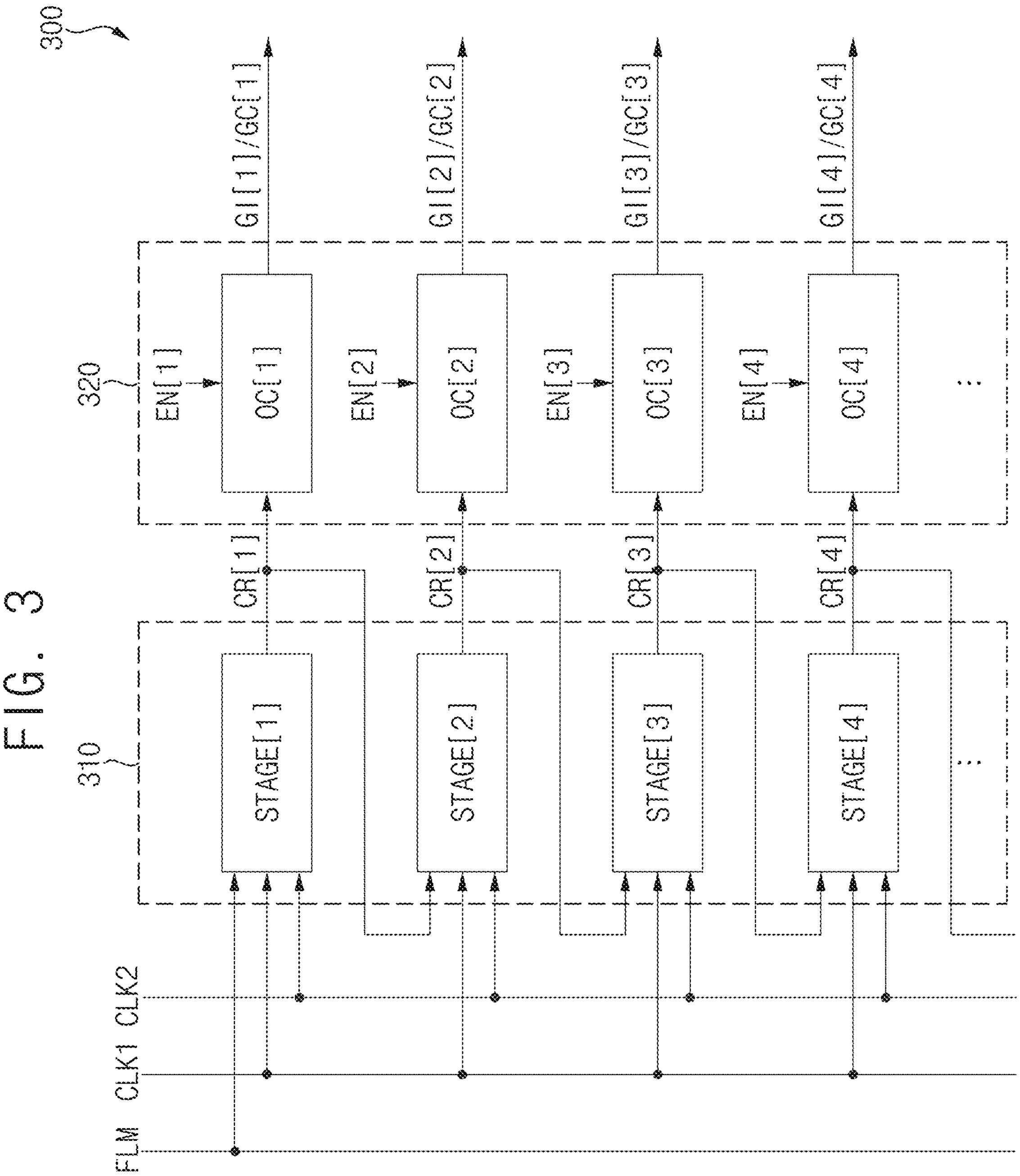
FIG. 3 is a block diagram illustrating an example of a gate driver of the display device of FIG. 1.
Figure 4:
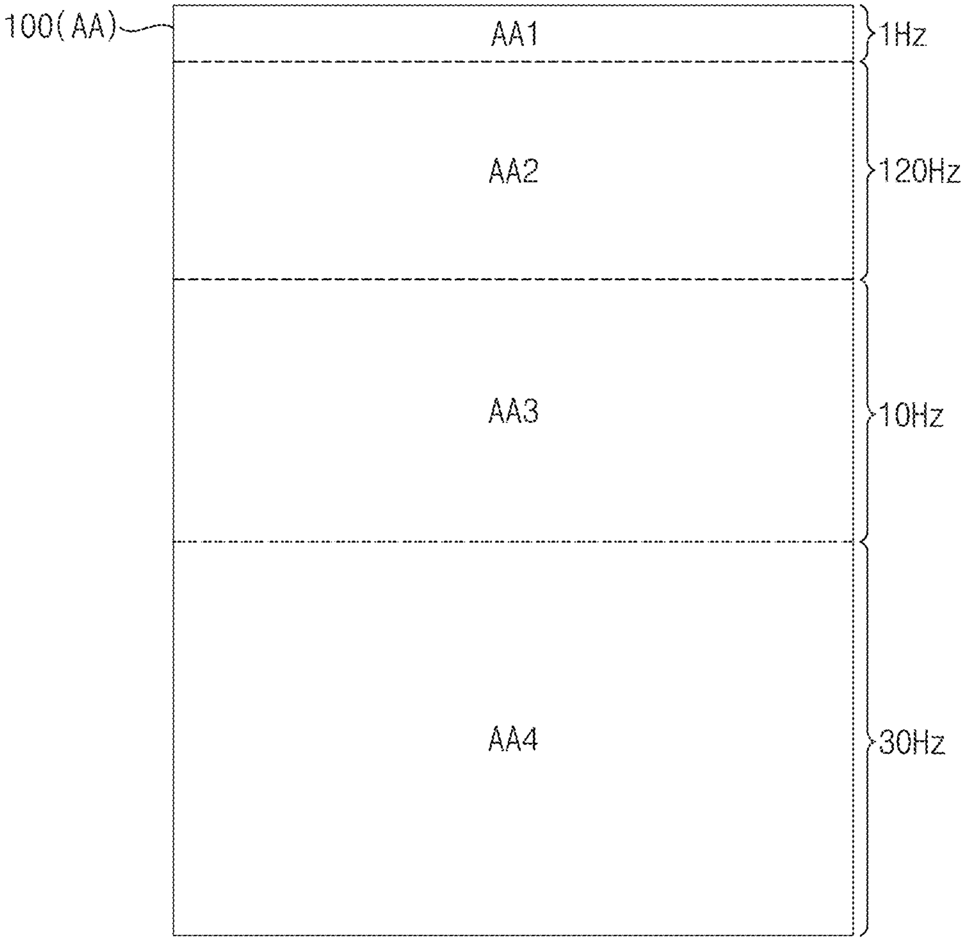
FIG. 4 is a diagram illustrating an example in which a display panel of the display device of FIG. 1 is driven.

FIG. 3 is a block diagram illustrating an example of a gate driver 300 of the display device of FIG. 1, and FIG. 4 is a diagram illustrating an example in which a display panel 100 of the display device of FIG. 1 is driven.

Referring to FIGS. 1 to 4, the gate driver 300 may include: a stage 310 configured to generate carry signals CR[1], CR[2], CR[3], and CR[4], and provide carry signals CR[1], CR[2], CR[3], and CR[4] to a next stage; and an output controller 320 configured to receive the carry signals CR[1], CR[2], CR[3], and CR[4], and output gate signals (e.g., initialization gate signals GI[1], GI[2], GI[3], and GI[4] and compensation gate signals GC[1], GC[2], GC[3], and GC[4]) corresponding to the carry signals CR[1], CR[2], CR[3], and CR[4] in response to enable signals EN[1], EN[2], EN[3], and EN[4].

The timing controller 200 may control driving frequencies of portions of the display panel 100 by controlling the enable signals EN[1], EN[2], EN[3], and EN[4] applied to the output controllers 320 configured to output the gate signals (e.g., the initialization gate signals GI[1], GI[2], GI[3], and GI[4] and the compensation gate signals GC[1], GC[2], GC[3], and GC[4]) to the portions of the display panel 100, respectively. The output controller may output the gate signals corresponding to the carry signals CR[1], CR[2], CR[3], and CR[4] when the enable signals EN[1], EN[2], EN[3], and EN[4] have activation levels, and output the gate signals (e.g., the initialization gate signals GI[1], GI[2], GI[3], and GI[4] and the compensation gate signals GC[1], GC[2], GC[3], and GC[4]) having inactivation levels when the enable signals EN[1], EN[2], EN[3], and EN[4] have inactivation levels.

In an embodiment, for example, the timing controller 200 may provide the enable signals EN[1], EN[2], EN[3], and EN[4] to the gate driver 300. The first control signal CONT1 may include the enable signals EN[1], EN[2], EN[3], and EN[4].

In an embodiment, for example, a first stage STAGE[1] may receive a start signal FLM to output a first carry signal CR[1]. A first output controller OC[1] may receive the first carry signal CR[1] to output a first initialization gate signal GI[1] and a first compensation gate signal GC[1]. The first initialization gate signal GI[1] and the first compensation gate signal GC[1] may have inactivation levels when the first enable signal EN[1] has an inactivation level. The first initialization gate signal GI[1] and the first compensation gate signal GC[1] may have voltage levels corresponding to the first carry signal CR[1] when the first enable signal EN[1] has an activation level. In other words, when the first enable signal EN[1] has the activation level, and the first carry signal CR[1] has a high voltage level, the first initialization gate signal GI[1] and the first compensation gate signal GC[1] may have high voltage levels. In addition, when the first enable signal EN[1] has the activation level, and the first carry signal CR[1] has a low voltage level, the first initialization gate signal GI[1] and the first compensation gate signal GC[1] may have low voltage levels. A second stage STAGE[2] may receive the first carry signal CR[1] instead of the start signal FLM to output a second carry signal CR[2].

In an embodiment, for example, as shown in FIG. 4, it will be assumed that a first display region AA1 is driven at a driving frequency of 1 Hz, a second display region AA2 is driven at a driving frequency of 120 Hz, a third display region AA3 is driven at a driving frequency of 10 Hz, and a fourth display region AA4 is driven at a driving frequency of 30 Hz. The enable signals EN[1], EN[2], EN[3], and EN[4] applied to the output controllers 320 configured to output the gate signals (e.g., the initialization gate signals GI[1], GI[2], GI[3], and GI[4] and the compensation gate signals GC[1], GC[2], GC[3], and GC[4]) to the first display region AA1, respectively, may have activation levels at a frequency of 1 Hz. The enable signals EN[1], EN[2], EN[3], and EN[4] applied to the output controllers 320 configured to output the gate signals (e.g., the initialization gate signals GI[1], GI[2], GI[3], and GI[4] and the compensation gate signals GC[1], GC[2], GC[3], and GC[4]) to the second display region AA2, respectively, may have activation levels at a frequency of 120 Hz. The enable signals EN[1], EN[2], EN[3], and EN[4] applied to the output controllers 320 configured to output the gate signals (e.g., the initialization gate signals GI[1], GI[2], GI[3], and GI[4] and the compensation gate signals GC[1], GC[2], GC[3], and GC[4]) to the third display region AA3, respectively, may have activation levels at a frequency of 10 Hz. The enable signals EN[1], EN[2], EN[3], and EN[4] applied to the output controllers 320 configured to output the gate signals (e.g., the initialization gate signals GI[1], GI[2], GI[3], and GI[4] and the compensation gate signals GC[1], GC[2], GC[3], and GC[4]) to the fourth display region AA4, respectively, may have activation levels at a frequency of 30 Hz.

Therefore, the gate driver 300 may include the output controller 320 connected to each of the stages 310, so that driving frequencies of partial regions of the display region AA may be varied independently of each other.

In an embodiment, for example, the next stage for the first stage STAGE[1] may be the second stage STAGE[2]. In an embodiment, for example, a next stage for the second stage STAGE[2] may be a third stage STAGE[3]. In an embodiment, for example, a next stage for the third stage STAGE[3] may be a fourth stage STAGE[4].

Although the next stage has been illustrated in the present embodiment as being an adjacent next stage, the present disclosure is not limited thereto. For another example, the next stage for the first stage STAGE[1] may be an $N^{th}$ stage (where N is a positive integer that is greater than or equal to 3).

Although an example in which the output controllers OC[1], OC[2], OC[3], and OC[4] receive the enable signals EN[1], EN[2], EN[3], and EN[4], respectively, has been shown in FIG. 3, in some embodiments, the output controllers OC[1], OC[2], OC[3], and OC[4] may receive a single enable signal. In this case, each of the output controllers (e.g., the first output controller OC[1]) may output a gate signal (e.g., the first initialization gate signal GI[1] and the first compensation gate signal GC[1]) according to whether the single enable signal has an activation level in a period where a carry signal (e.g., the first carry signal CR[1]) corresponding to the gate signal has an activation level.

Although the gate signals output from the output controller 320 has been illustrated in the present embodiment as being the initialization gate signals GI[1], GI[2], GI[3], and GI[4] and the compensation gate signals GC[1], GC[2], GC[3], and GC[4], the present disclosure is not limited to a type of the gate signal output from the output controller 320.

Figure 5:
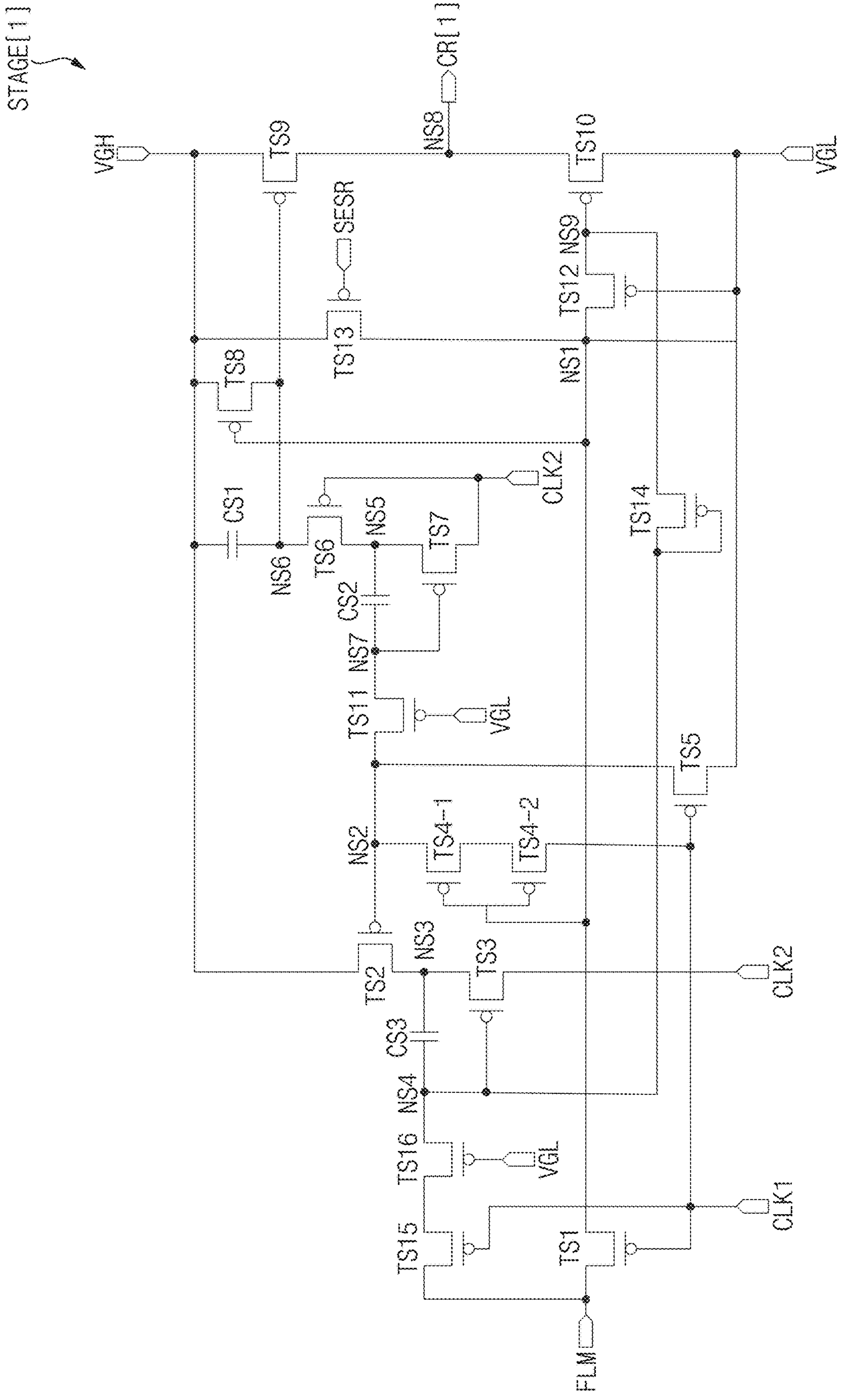
FIG. 5 is a circuit diagram illustrating an example of a first stage of the gate driver of FIG. 3.
Figure 6:
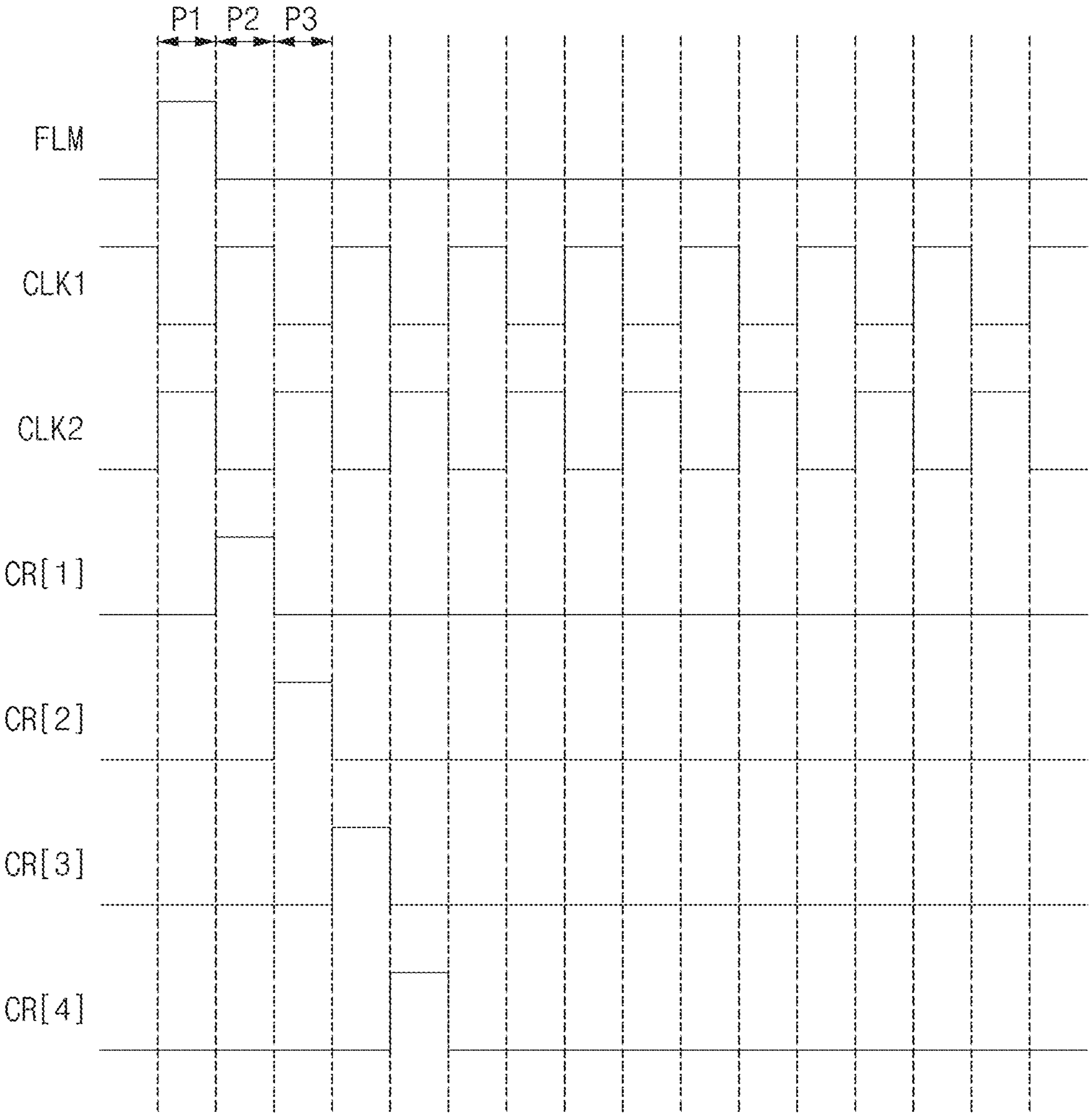
FIG. 6 is a timing diagram illustrating an example of an operation of a stage of the gate driver of FIG. 3.

FIG. 5 is a circuit diagram illustrating an example of a first stage STAGE[1] of the gate driver 300 of FIG. 3, and FIG. 6 is a timing diagram illustrating an example of an operation of a stage 310 of the gate driver 300 of FIG. 3.

The stages 310 of the gate driver 300 except for the first stage STAGE[1] may be substantially the same as the first stage STAGE[1] except for applied signals.

FIGS. 5 and 6 show that the gate signal output from the first output controller OC[1] has a high voltage level as an activation level.

Referring to FIGS. 5 and 6, the first stage STAGE[1] may include: a first stage transistor TS1 including a control electrode configured to receive a first clock signal CLK1, a first electrode configured to receive an input signal (e.g., a start signal FLM), and a second electrode connected to a first stage node NS1; a second stage transistor TS2 including a control electrode connected to a second stage node NS2, a first electrode configured to receive a high voltage VGH, and a second electrode connected to a third stage node NS3; a third stage transistor TS3 including a control electrode connected to a fourth stage node NS4, a first electrode configured to receive a second clock signal CLK2 and a second electrode connected to the third stage node NS3; a fourth stage transistor TS4-1 and TS4-2 including a control electrode connected to the first stage node NS1, a first electrode configured to receive the first clock signal CLK1, and a second electrode connected to the second stage node NS2; a fifth stage transistor TS5 including a control electrode configured to receive the first clock signal CLK1, a first electrode configured to receive a low voltage VGL, and a second electrode connected to the second stage node NS2; a sixth stage transistor TS6 including a control electrode configured to receive the second clock signal CLK2, a first electrode connected to a fifth stage node NS5, and a second electrode connected to a sixth stage node NS6; a seventh stage transistor TS7 including a control electrode connected to a seventh stage node NS7, a first electrode configured to receive the second clock signal CLK2, and a second electrode connected to the fifth stage node NS5; an eighth stage transistor TS8 including a control electrode connected to the first stage node NS1, a first electrode configured to receive the high voltage VGH, and a second electrode connected to the sixth stage node NS6; a ninth stage transistor TS9 including a control electrode connected to the sixth stage node NS6, a first electrode configured to receive the high voltage VGH, and a second electrode connected to an eighth stage node NS8, through which the carry signal (e.g., the first carry signal CR[1]) is output; a tenth stage transistor TS10 including a control electrode connected to a ninth stage node NS9, a first electrode configured to receive the low voltage VGL, and a second electrode connected to the eighth stage node NS8; an eleventh stage transistor TS11 including a control electrode configured to receive the low voltage VGL, a first electrode connected to the second stage node NS2, and a second electrode connected to the seventh stage node NS7; a twelfth stage transistor TS12 including a control electrode configured to receive the low voltage VGL, a first electrode connected to the first stage node NS1, and a second electrode connected to the ninth stage node NS9; a first stage capacitor CS1 including a first electrode configured to receive the high voltage VGH, and a second electrode connected to the sixth stage node NS6; a second stage capacitor CS2 including a first electrode connected to the seventh stage node NS7, and a second electrode connected to the fifth stage node NS5; and a third stage capacitor CS3 including a first electrode connected to the fourth stage node NS4, and a second electrode connected to the third stage node NS3. The first stage STAGE[1] may include: a thirteenth stage transistor TS13 including a control electrode configured to receive an initialization signal SESR, a first electrode configured to receive the high voltage VGH, and a second electrode connected to the first stage node NS1; a fourteenth stage transistor TS14 including a control electrode connected to the fourth stage node NS4, a first electrode connected to the fourth stage node NS4, and a second electrode connected to the ninth stage node NS9; a fifteenth stage transistor TS15 including a control electrode configured to receive the first clock signal CLK1, a first electrode configured to receive the input signal (e.g., the start signal FLM), and a second electrode connected to a first electrode of a sixteenth stage transistor TS16; and the sixteenth stage transistor TS16 including a control electrode configured to receive the low voltage VGL, the first electrode connected to the second electrode of the fifteenth stage transistor TS15, and a second electrode connected to the fourth stage node NS4.

In an embodiment, for example, the fourth stage transistor TS4-1 and TS4-2 may have a dual structure. In an embodiment, for example, the fourth stage transistor TS4-1 and TS4-2 may include a fourth-first stage transistor TS4-1 and a fourth-second stage transistor TS4-2, which are connected in series.

In an embodiment, for example, the high voltage VGH may be a voltage having a high voltage level, and the low voltage VGL may be a voltage having a low voltage level.

In an embodiment, for example, in a first period P1, the first stage transistor TS1 may transmit the start signal FLM having a high voltage level to the first stage node NS1 in response to the first clock signal CLK1. Since the twelfth stage transistor TS12 is always turned on, the start signal FLM having the high voltage level may be transmitted to the ninth stage node NS9 (i.e., the control electrode of the tenth stage transistor TS10). Therefore, the tenth stage transistor TS10 may be turned off. In addition, the fifth stage transistor TS5 may transmit the low voltage VGL to the second stage node NS2 in response to the first clock signal CLK1. Since the eleventh stage transistor TS11 is always turned on, the low voltage VGL may be transmitted to the seventh stage node NS7 (i.e., the control electrode of the seventh stage transistor TS7).

In an embodiment, for example, in a second period P2, the seventh stage transistor TS7 may transmit the second clock signal CLK2 having a low voltage level to the fifth stage node NS5 in response to a signal of the seventh stage node NS7. The sixth stage transistor TS6 may transmit the second clock signal CLK2 having the low voltage level to the sixth stage node NS6 in response to the second clock signal CLK2 having the low voltage level. Therefore, the ninth stage transistor TS9 may be turned on, the tenth stage transistor TS10 may be turned off, and the first carry signal CR[1] having a high voltage level may be output through the eighth stage node NS8. The second stage STAGE[2] may receive the first carry signal CR[1] having the high voltage level from the first stage STAGE[1] to start an operation that is similar to the operation of the first stage STAGE[1] in the first period P1.

In an embodiment, for example, in a third period P3, the first stage transistor TS1 may transmit the start signal FLM having a low voltage level to the first stage node NS1 in response to the first clock signal CLK1. Since the twelfth stage transistor TS12 is always turned on, the start signal FLM having the low voltage level may be transmitted to the ninth stage node NS9 (i.e., the control electrode of the tenth stage transistor TS10). In addition, the eighth stage transistor TS8 may transmit the high voltage VGH to the sixth stage node NS6 in response to a signal of the first stage node NS1 having a low voltage level. Therefore, the ninth stage transistor TS9 may be turned off, the tenth stage transistor TS10 may be turned on, and the first carry signal CR[1] having a low voltage level may be output through the eighth stage node NS8.

In an embodiment, the first clock signal CLK1 and the second clock signal CLK2 of even-numbered stages (e.g., the second stage STAGE[2] and the fourth stage STAGE[4]) may be interchanged in odd-numbered stages (e.g., the first stage STAGE[1] and the third stage STAGE[3]).

Figure 7:
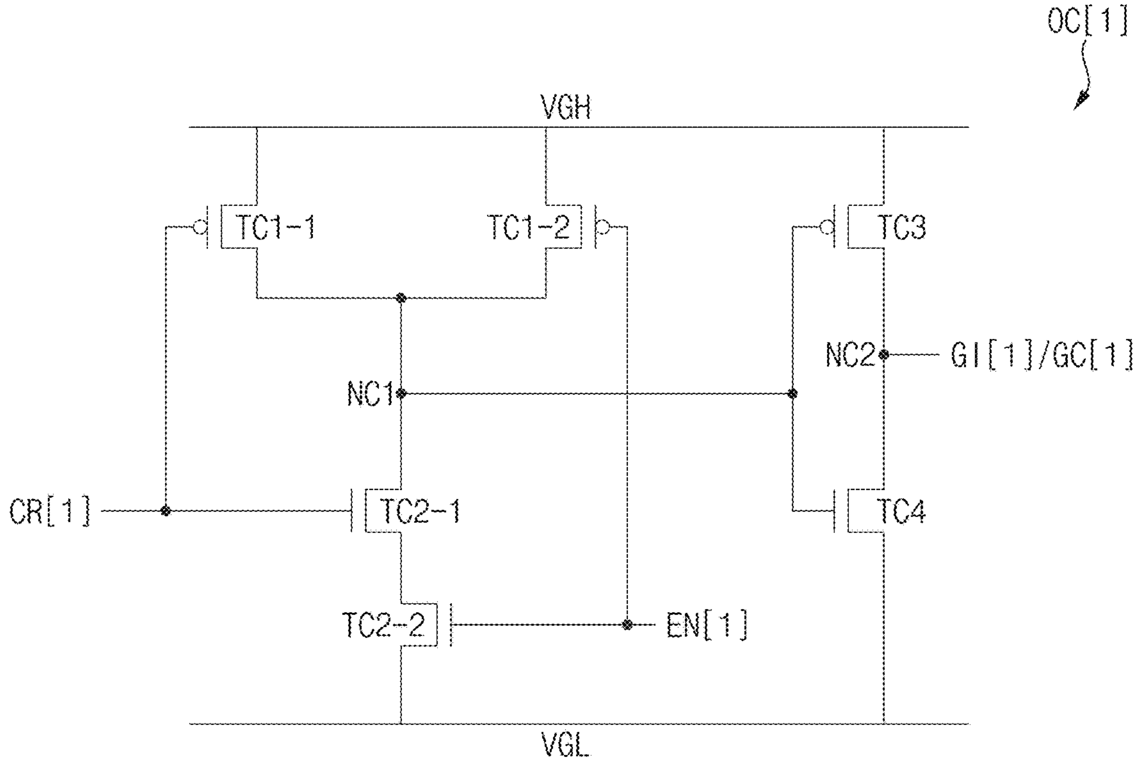
FIG. 7 is a circuit diagram illustrating an example of a first output controller of the gate driver of FIG. 3.

FIG. 7 is a circuit diagram illustrating an example of a first output controller OC[1] of the gate driver 300 of FIG. 3, and FIGS. 8 to 11 are circuit diagrams illustrating an example of an operation of the first output controller OC[1] of FIG. 7.

The output controllers 320 of the gate driver 300 except for the first output controller OC[1] may be substantially the same as the first output controller OC[1].

FIGS. 7 to 11 show that the gate signal output from the first output controller OC[1] has a high voltage level H as an activation level, and the first enable signal EN[1] has the high voltage level H as an activation level.

Referring to FIGS. 7 to 11, the first output controller OC[1] may control a voltage of the first control node NC1 in the first output controller OC[1] based on the first carry signal CR[1] and the first enable signal EN[1], and output the gate signal (e.g., the first initialization gate signal GI[1] and the first compensation gate signal GC[1]) based on the voltage of the first control node NC1. The first output controller OC[1] may include: a first-first control transistor TC1-1 including a control electrode configured to receive the first carry signal CR[1], a first electrode configured to receive a high voltage VGH, and a second electrode connected to the first control node NC1; a first-second control transistor TC1-2 including a control electrode configured to receive the enable signal (e.g., the first enable signal EN[1]), a first electrode configured to receive the high voltage VGH, and a second electrode connected to the first control node NC1; a second-first control transistor TC2-1 including a control electrode configured to receive the carry signal (e.g., the first carry signal CR[1]), a first electrode connected to a second electrode of a second-second control transistor TC2-2, and a second electrode connected to the first control node NC1; the second-second control transistor TC2-2 including a control electrode configured to receive the enable signal (e.g., the first enable signal EN[1]), a first electrode configured to receive a low voltage VGL, and the second electrode connected to the first electrode of the second-first control transistor TC2-1; a third control transistor TC3 including a control electrode connected to the first control node NC1, a first electrode configured to receive the high voltage VGH, and a second electrode connected to a second control node NC2, through which the gate signal (e.g., the first initialization gate signal GI[1] and the first compensation gate signal GC[1]) is output; and a fourth control transistor TC4 including a control electrode connected to the first control node NC1, a first electrode configured to receive the low voltage VGL, and a second electrode connected to the second control node NC2.

In an embodiment, the first-first control transistor TC1-1, the first-second control transistor TC1-2, and the third control transistor TC3 may be implemented as PMOS transistors. In an embodiment, the second-first control transistor TC2-1, the second-second control transistor TC2-2, and the fourth control transistor TC4 may be implemented as NMOS transistors.

Figure 8:
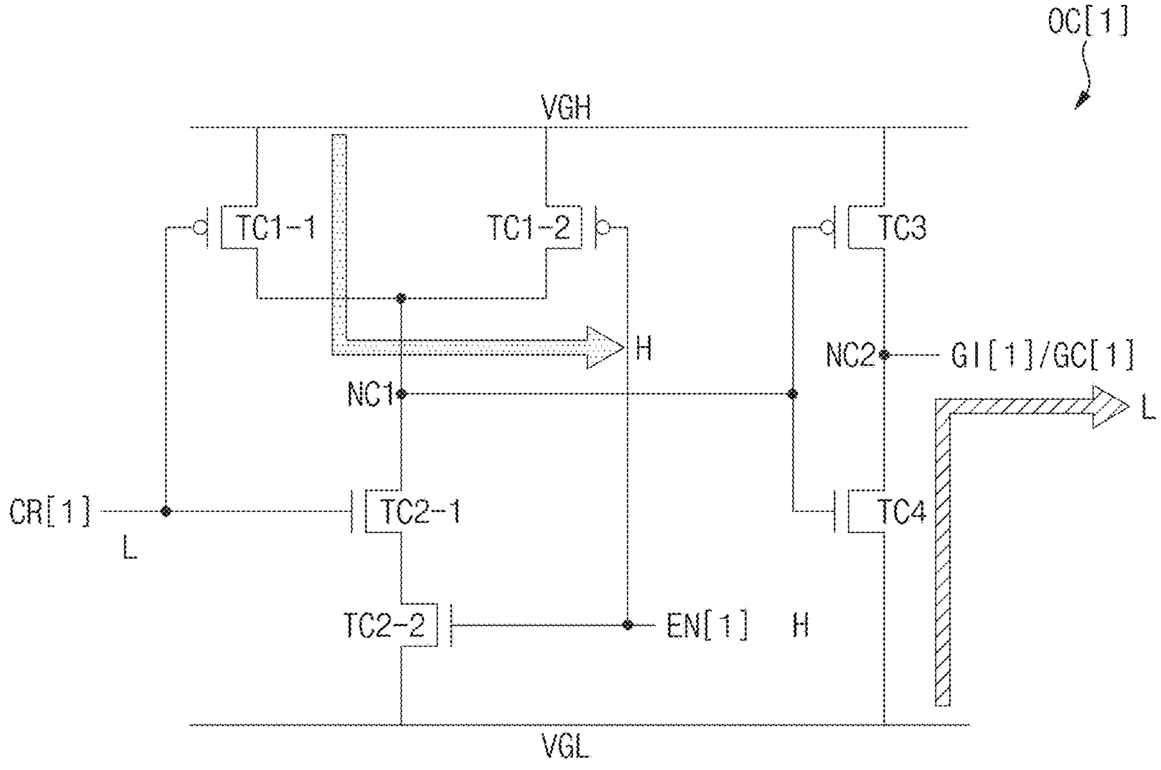
FIGS. 8 to 11 are circuit diagrams illustrating an example of an operation of the first output controller of FIG. 7.

In an embodiment, for example, as shown in FIG. 8, it will be assumed that the first carry signal CR[1] having a low voltage level L and the first enable signal EN[1] having the high voltage level H are applied to the first output controller OC[1]. In this case, the first-first control transistor TC1-1 and the second-second control transistor TC2-2 may be turned on, and the first-second control transistor TC1-2 and the second-first control transistor TC2-1 may be turned off. Therefore, the first-first control transistor TC1-1 may apply the high voltage VGH having the high voltage level H to the first control node NC1. In addition, the fourth control transistor TC4 may be turned on, and the third control transistor TC3 may be turned off. Therefore, the fourth control transistor TC4 may apply the low voltage VGL having the low voltage level L to the second control node NC2. Accordingly, the first output controller OC[1] may output the first initialization gate signal GI[1] and the first compensation gate signal GC[1] having the low voltage levels L.

Figure 9:
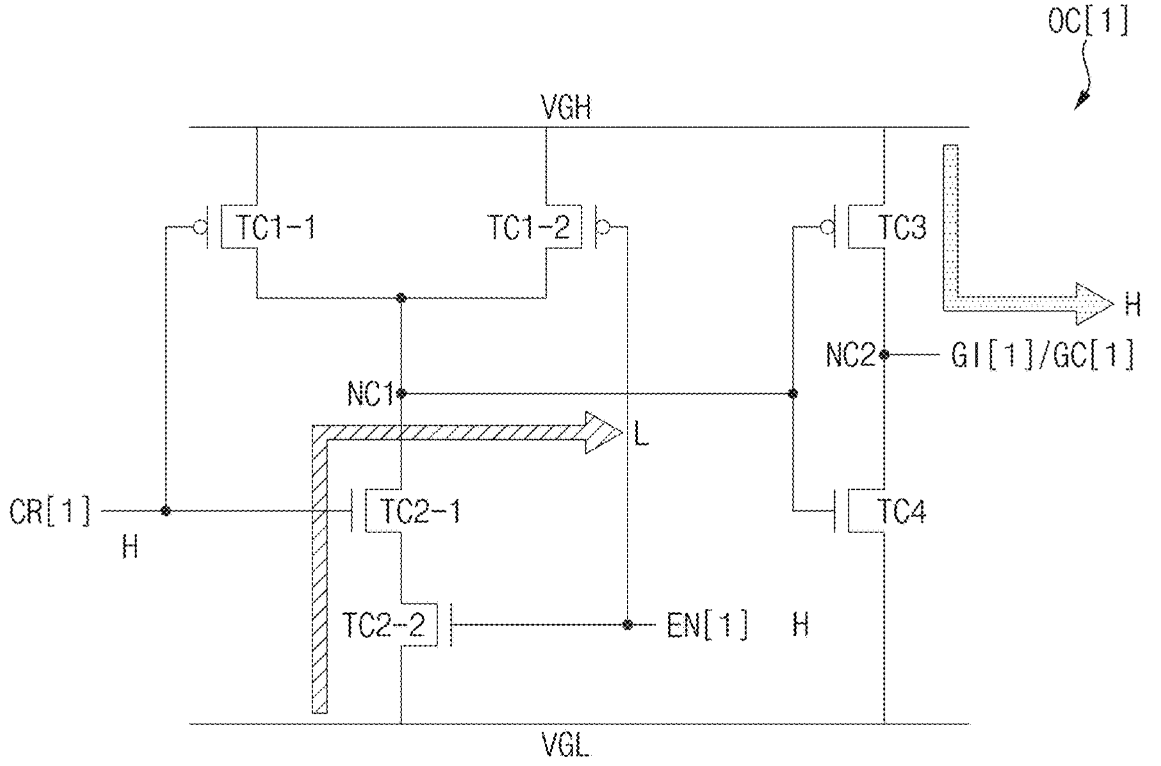

In an embodiment, for example, as shown in FIG. 9, it will be assumed that the first carry signal CR[1] having the high voltage level H and the first enable signal EN[1] having the high voltage level H are applied to the first output controller OC[1]. In this case, the first-first control transistor TC1-1 and the first-second control transistor TC1-2 may be turned off, and the second-first control transistor TC2-1 and the second-second control transistor TC2-2 may be turned on. Therefore, the second-first control transistor TC2-1 and the second-second control transistor TC2-2 may apply the low voltage VGL having the low voltage level L to the first control node NC1. In addition, the fourth control transistor TC4 may be turned off, and the third control transistor TC3 may be turned on. Therefore, the third control transistor TC3 may apply the high voltage VGH having the high voltage level H to the second control node NC2. Accordingly, the first output controller OC[1] may output the first initialization gate signal GI[1] and the first compensation gate signal GC[1] having the high voltage levels H.

Figure 10:
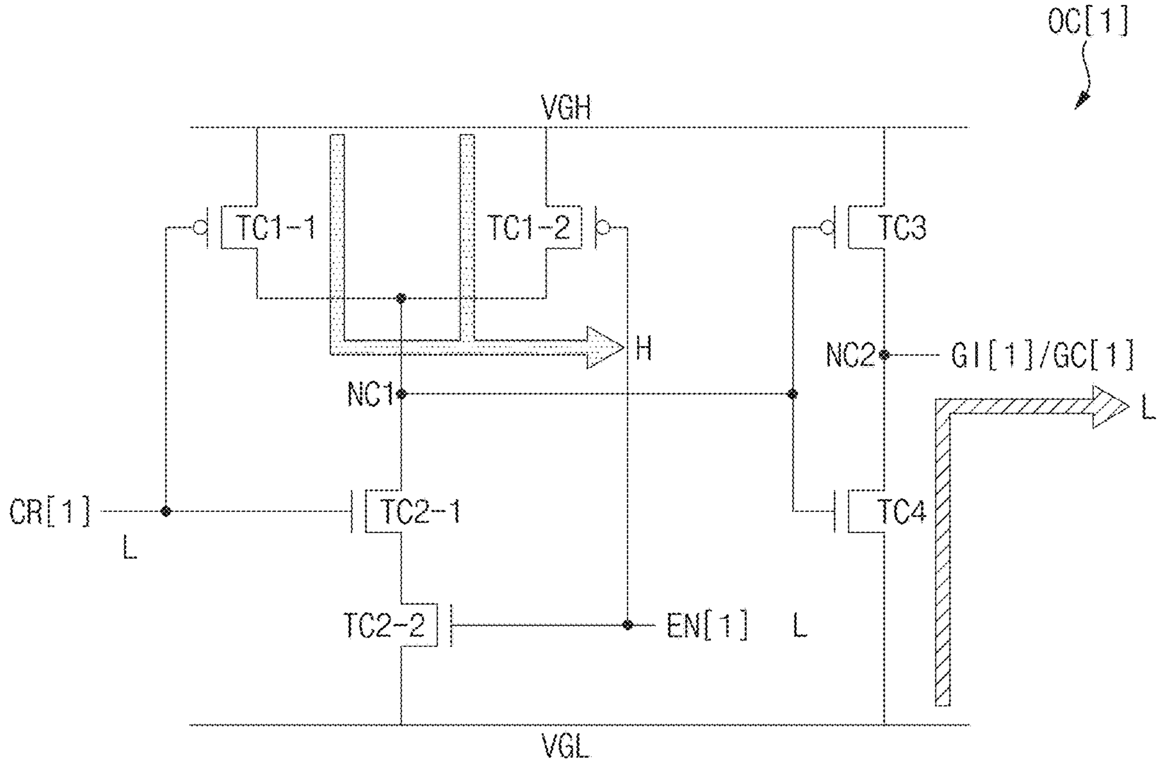

In an embodiment, for example, as shown in FIG. 10, it will be assumed that the first carry signal CR[1] having the low voltage level L and the first enable signal EN[1] having the low voltage level L are applied to the first output controller OC[1]. In this case, the first-first control transistor TC1-1 and the first-second control transistor TC1-2 may be turned on, and the second-first control transistor TC2-1 and the second-second control transistor TC2-2 may be turned off. Therefore, each of the first-first control transistor TC1-1 and the first-second control transistor TC1-2 may apply the high voltage VGH having the high voltage level H to the first control node NC1. In addition, the fourth control transistor TC4 may be turned on, and the third control transistor TC3 may be turned off. Therefore, the fourth control transistor TC4 may apply the low voltage VGL having the low voltage level L to the second control node NC2. Accordingly, the first output controller OC[1] may output the first initialization gate signal GI[1] and the first compensation gate signal GC[1] having the low voltage levels L.

Figure 11:
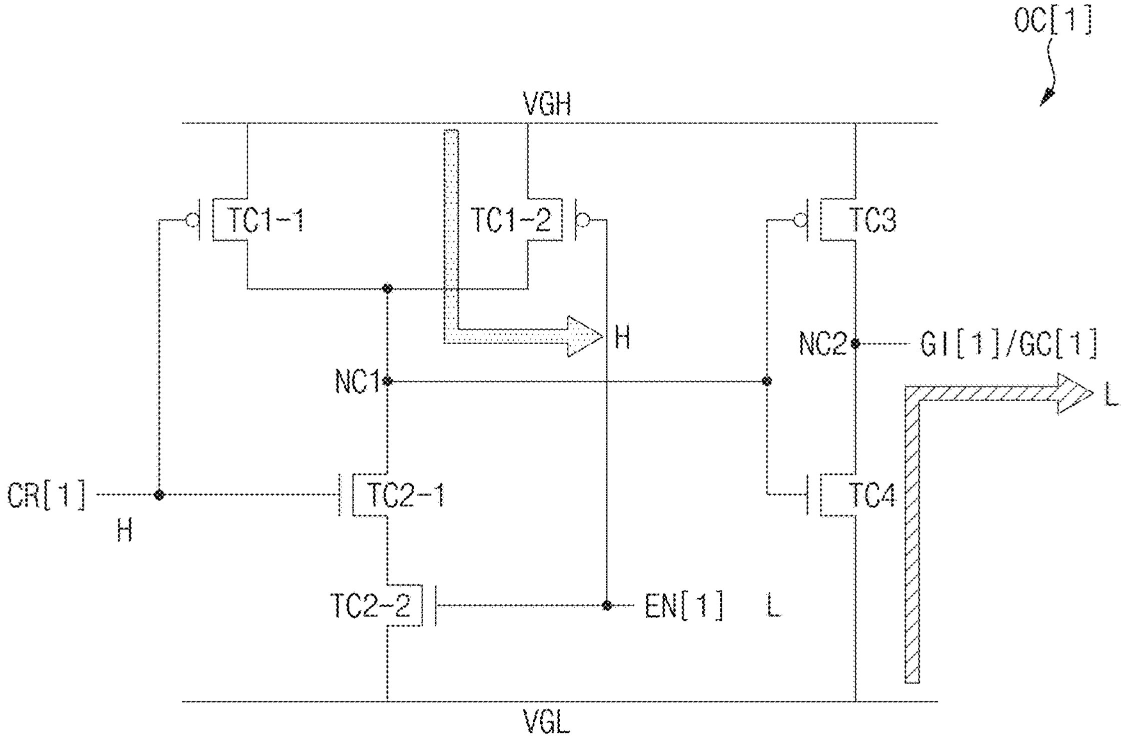

In an embodiment, for example, as shown in FIG. 11, it will be assumed that the first carry signal CR[1] having the high voltage level H and the first enable signal EN[1] having the low voltage level L are applied to the first output controller OC[1]. In this case, the first-second control transistor TC1-2 and the second-first control transistor TC2-1 may be turned on, and the first-first control transistor TC1-1 and the second-second control transistor TC2-2 may be turned off. Therefore, the first-second control transistor TC1-2 may apply the high voltage VGH having the high voltage level H to the first control node NC1. In addition, the fourth control transistor TC4 may be turned on, and the third control transistor TC3 may be turned off. Therefore, the fourth control transistor TC4 may apply the low voltage VGL having the low voltage level L to the second control node NC2. Accordingly, the first output controller OC[1] may output the first initialization gate signal GI[1] and the first compensation gate signal GC[1] having the low voltage levels L.

Figure 12:
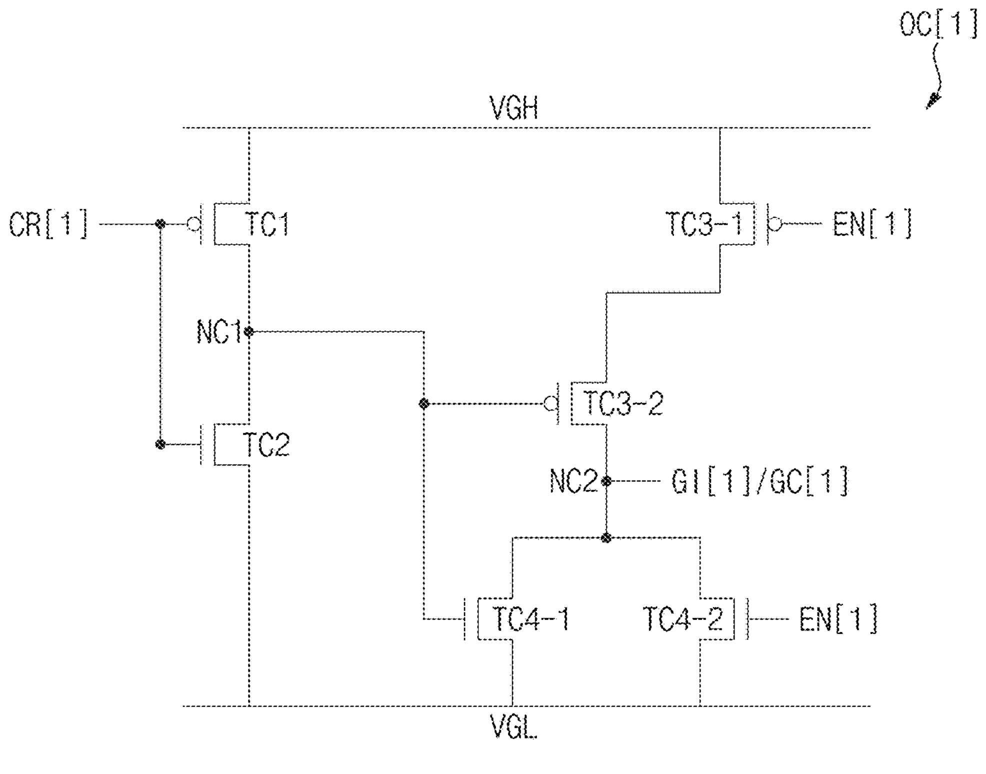
FIG. 12 is a circuit diagram illustrating a first output controller of a gate driver of a display device according to embodiments.

FIG. 12 is a circuit diagram illustrating a first output controller OC[1] of a gate driver 300 of a display device according to embodiments, and FIGS. 13 to 16 are circuit diagrams illustrating an example of an operation of the first output controller OC[1] of FIG. 12.

Since a display device according to the present embodiments has a configuration that is substantially identical to the configuration of the display device of FIG. 1 except for the output controller 320, the same reference numbers and reference symbols will be used for the same or similar components, and redundant descriptions will be omitted.

The output controllers 320 of the gate driver 300 except for the first output controller OC[1] may be substantially the same as the first output controller OC[1].

FIGS. 12 to 16 show that the gate signal output from the first output controller OC[1] has a high voltage level H as an activation level, and the first enable signal EN[1] has a low voltage level L as an activation level.

Referring to FIGS. 12 to 16, the first output controller OC[1] may control a voltage of the first control node NC1 based on the first carry signal CR[1], and output the gate signal (e.g., the first initialization gate signal GI[1] and the first compensation gate signal GC[1]) based on the voltage of the first control node NC1 and the first enable signal EN[1]. The first output controller OC[1] may include: a first control transistor TC1 including a control electrode configured to receive the carry signal (e.g., the first carry signal CR[1]), a first electrode configured to receive a high voltage VGH, and a second electrode connected to the first control node NC1; a second control transistor TC2 including a control electrode configured to receive the carry signal (e.g., the first carry signal CR[1]), a first electrode configured to receive a low voltage VGL, and a second electrode connected to the first control node NC1; a third-first control transistor TC3-1 including a control electrode configured to receive the enable signal (e.g., the first enable signal EN[1]), a first electrode configured to receive the high voltage VGH, and a second electrode connected to a first electrode of a third-second control transistor TC3-2; the third-second control transistor TC3-2 including a control electrode connected to the first control node NC1, the first electrode connected to the second electrode of the third-first control transistor TC3-1, and a second electrode connected to a second control node NC2, through which the gate signal (e.g., the first initialization gate signal GI[1] and the first compensation gate signal GC[1]) is output; a fourth-first control transistor TC4-1 including a control electrode connected to the first control node NC1, a first electrode configured to receive the low voltage VGL, and a second electrode connected to the second control node NC2; and a fourth-second control transistor TC4-2 including a control electrode configured to receive the enable signal (e.g., the first enable signal EN[1]), a first electrode configured to receive the low voltage VGL, and a second electrode connected to the second control node NC2.

In an embodiment, the first control transistor TC1, the third-first control transistor TC3-1, and the third-second control transistor TC3-2 may be implemented as PMOS transistors. In an embodiment, the second control transistor TC2, the fourth-first control transistor TC4-1, and the fourth-second control transistor TC4-2 may be implemented as NMOS transistors.

Figure 13:
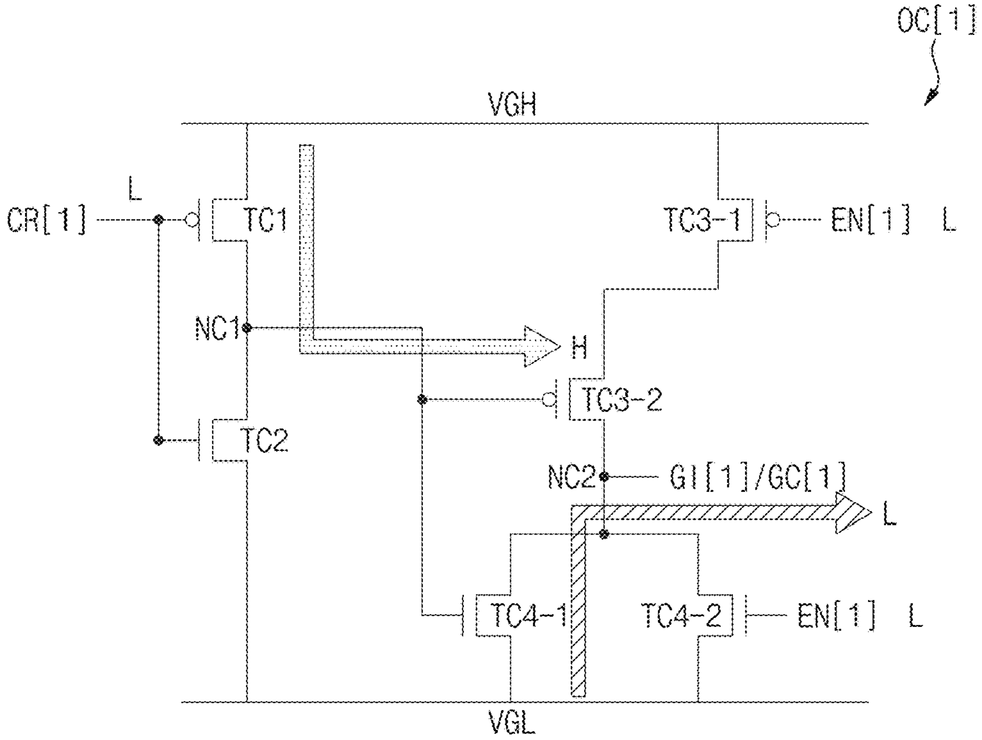
FIGS. 13 to 16 are circuit diagrams illustrating an example of an operation of the first output controller of FIG. 12.

In an embodiment, for example, as shown in FIG. 13, it will be assumed that the first carry signal CR[1] having the low voltage level L and the first enable signal EN[1] having the low voltage level L are applied to the first output controller OC[1]. In this case, the first control transistor TC1 may be turned on, and the second control transistor TC2 may be turned off. Therefore, the first control transistor TC1 may apply the high voltage VGH having the high voltage level H to the first control node NC1. In addition, the third-first control transistor TC3-1 and the fourth-first control transistor TC4-1 may be turned on, and the third-second control transistor TC3-2 and the fourth-second control transistor TC4-2 may be turned off. Therefore, the fourth-first control transistor TC4-1 may apply the low voltage VGL having the low voltage level L to the second control node NC2. Accordingly, the first output controller OC[1] may output the first initialization gate signal GI[1] and the first compensation gate signal GC[1] having the low voltage levels L.

Figure 14:
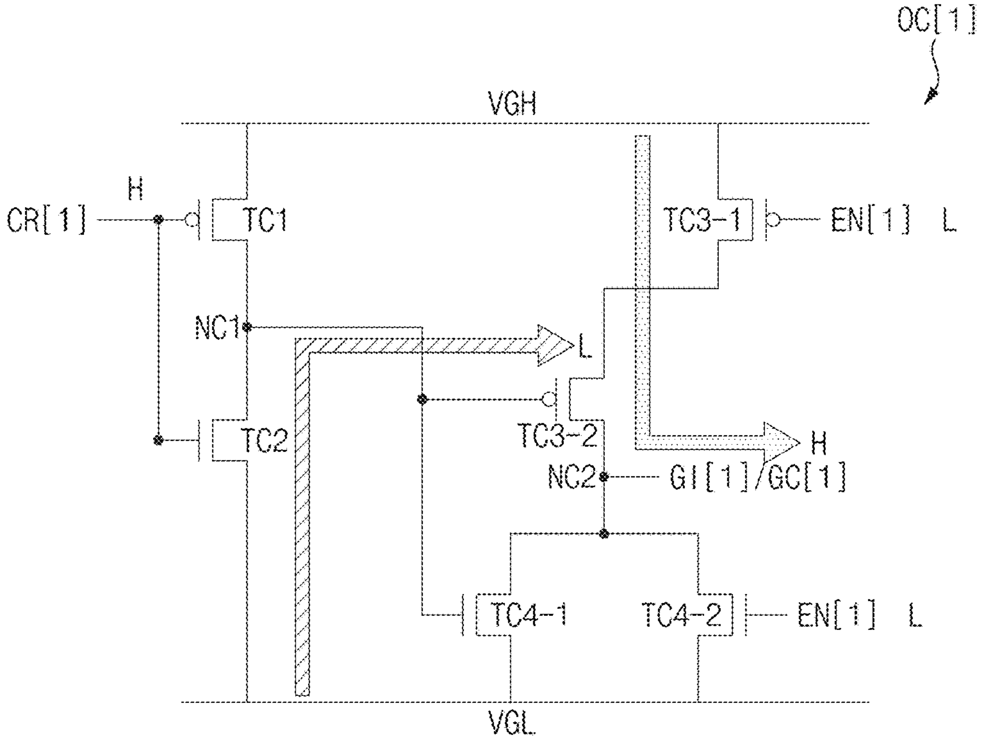

In an embodiment, for example, as shown in FIG. 14, it will be assumed that the first carry signal CR[1] having the high voltage level H and the first enable signal EN[1] having the low voltage level L are applied to the first output controller OC[1]. In this case, the first control transistor TC1 may be turned off, and the second control transistor TC2 may be turned on. Therefore, the second control transistor TC2 may apply the low voltage VGL having the low voltage level L to the first control node NC1. In addition, the fourth-first control transistor TC4-1 and the fourth-second control transistor TC4-2 may be turned off, and the third-first control transistor TC3-1 and the third-second control transistor TC3-2 may be turned on. Therefore, each of the third-first control transistor TC3-1 and the third-second control transistor TC3-2 may apply the high voltage VGH having the high voltage level H to the second control node NC2. Accordingly, the first output controller OC[1] may output the first initialization gate signal GI[1] and the first compensation gate signal GC[1] having the high voltage levels H.

Figure 15:
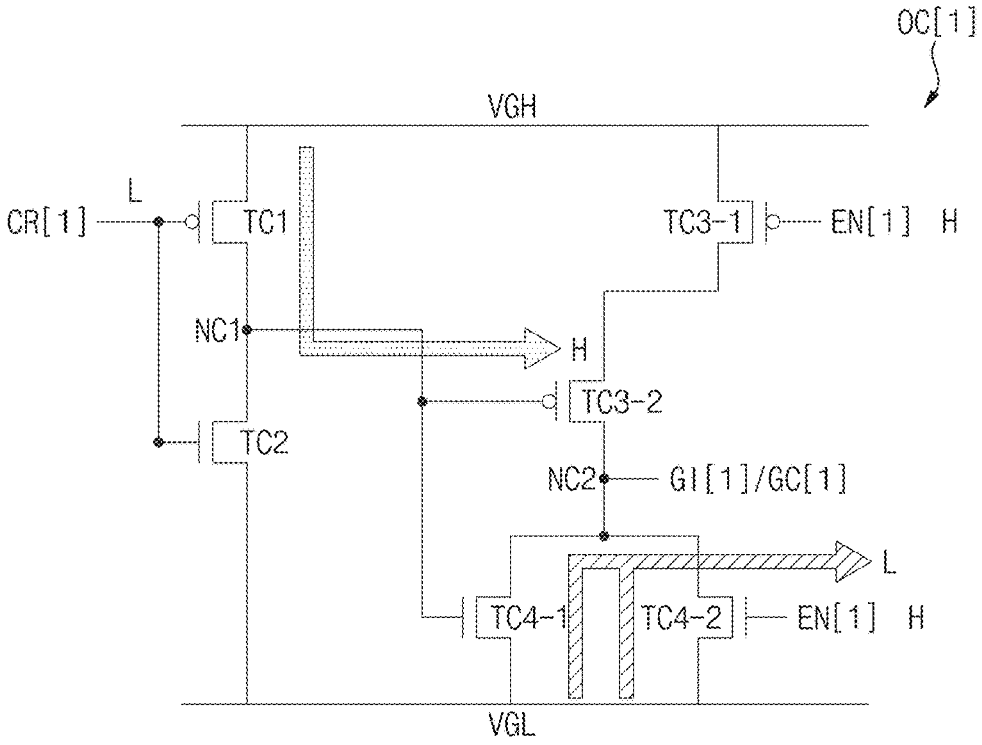

In an embodiment, for example, as shown in FIG. 15, it will be assumed that the first carry signal CR[1] having the low voltage level L and the first enable signal EN[1] having the high voltage level H are applied to the first output controller OC[1]. In this case, the first control transistor TC1 may be turned on, and the second control transistor TC2 may be turned off. Therefore, the first control transistor TC1 may apply the high voltage VGH having the high voltage level H to the first control node NC1. In addition, the fourth-first control transistor TC4-1 and the fourth-second control transistor TC4-2 may be turned on, and the third-first control transistor TC3-1 and the third-second control transistor TC3-2 may be turned off. Therefore, each of the fourth-first control transistor TC4-1 and the fourth-second control transistor TC4-2 may apply the low voltage VGL having the low voltage level L to the second control node NC2. Accordingly, the first output controller OC[1] may output the first initialization gate signal GI[1] and the first compensation gate signal GC[1] having the low voltage levels L.

Figure 16:
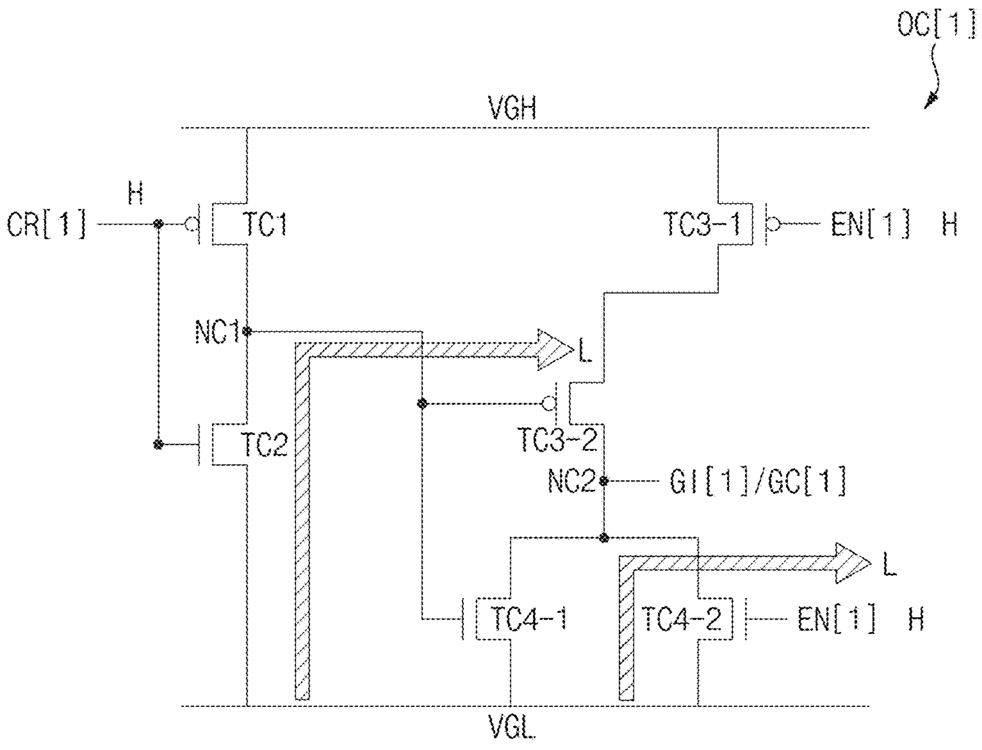

In an embodiment, for example, as shown in FIG. 16, it will be assumed that the first carry signal CR[1] having the high voltage level H and the first enable signal EN[1] having the high voltage level H are applied to the first output controller OC[1]. In this case, the first control transistor TC1 may be turned off, and the second control transistor TC2 may be turned on. Therefore, the second control transistor TC2 may apply the low voltage VGL having the low voltage level L to the first control node NC1. In addition, the third-second control transistor TC3-2 and the fourth-second control transistor TC4-2 may be turned on, the third-first control transistor TC3-1 and the fourth-first control transistor TC4-1 may be turned off. Therefore, the fourth-second control transistor TC4-2 may apply the low voltage VGL having the low voltage level L to the second control node NC2. Accordingly, the first output controller OC[1] may output the first initialization gate signal GI[1] and the first compensation gate signal GC[1] having the low voltage levels L.

Figure 17:
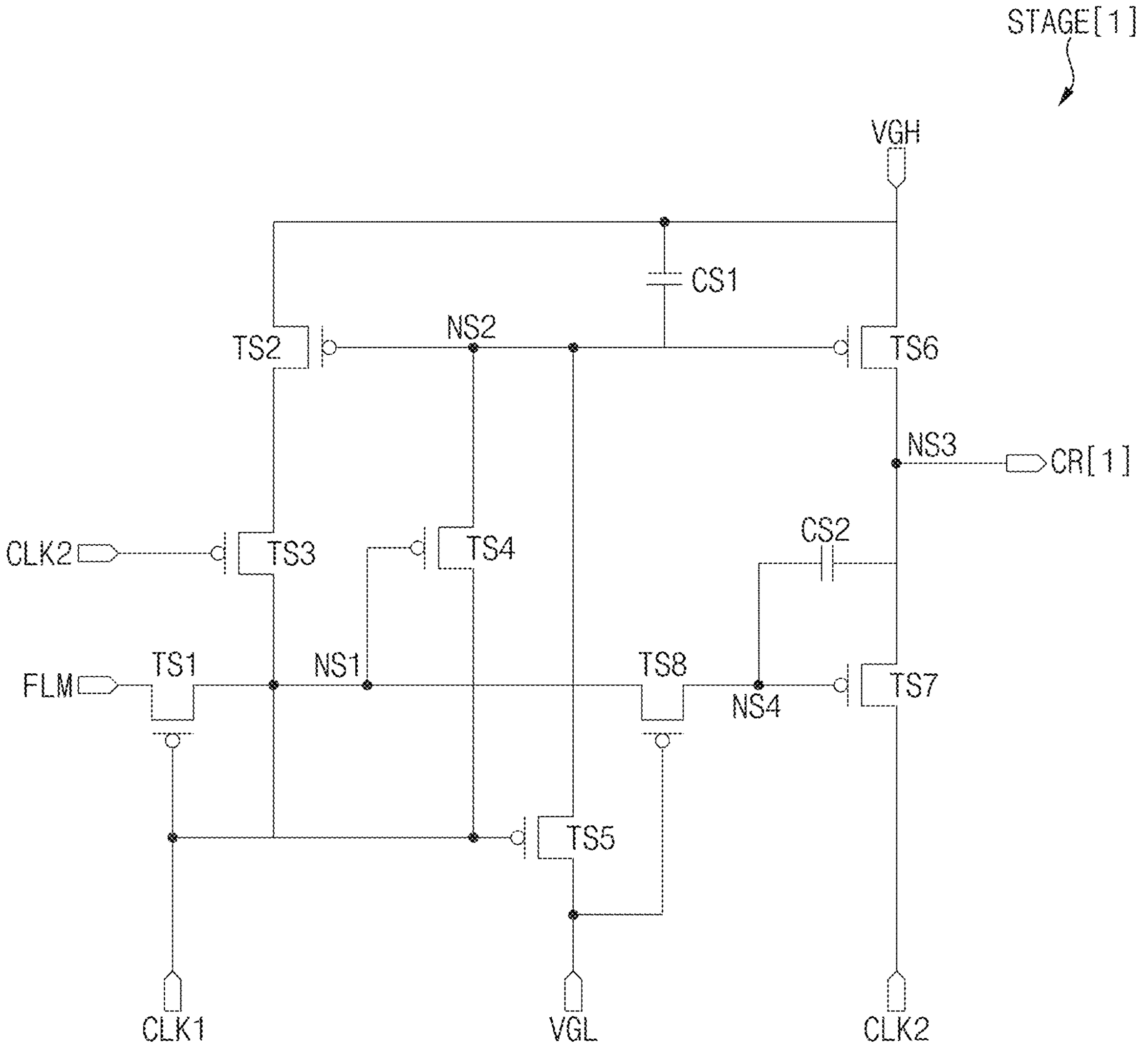
FIG. 17 is a circuit diagram illustrating a first stage of a gate driver of a display device according to embodiments.
Figure 18:
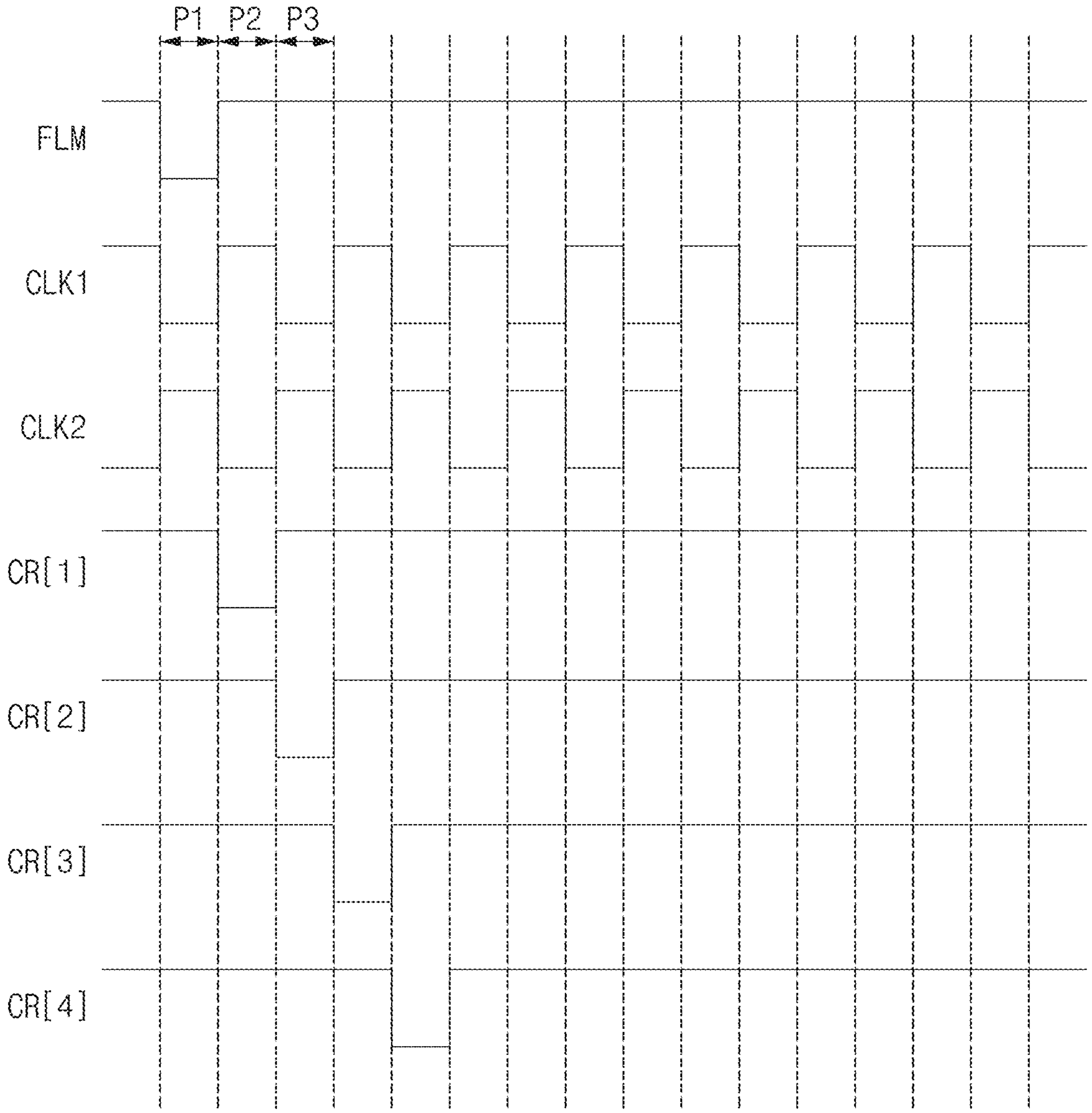
FIG. 18 is a timing diagram illustrating an example of an operation of a stage of the display device of FIG. 17.

FIG. 17 is a circuit diagram illustrating a first stage STAGE[1] of a gate driver 300 of a display device according to embodiments, and FIG. 18 is a timing diagram illustrating an example of an operation of a stage 310 of the display device of FIG. 17.

The stages 310 of the gate driver 300 except for the first stage STAGE[1] may be substantially the same as the first stage STAGE[1] except for applied signals.

FIGS. 17 and 18 show that the gate signal output from the first output controller OC[1] has a low voltage level as an activation level.

Since a display device according to the present embodiments has a configuration that is substantially identical to the configuration of the display device of FIG. 1 except for the gate driver 300, the same reference numbers and reference symbols will be used for the same or similar components, and redundant descriptions will be omitted.

Referring to FIGS. 3, 17, and 18, the first stage STAGE[1] may include: a first stage transistor TS1 including a control electrode configured to receive a first clock signal CLK1, a first electrode configured to receive an input signal (e.g., a start signal FLM), and a second electrode connected to a first stage node NS1; a second stage transistor TS2 including a control electrode connected to a second stage node NS2, a first electrode configured to receive a high voltage VGH, and a second electrode connected to a second electrode of a third stage transistor TS3; the third stage transistor TS3 including a control electrode configured to receive a second clock signal CLK2, a first electrode connected to the first stage node NS1, and the second electrode connected to the second electrode of the second stage transistor TS2; a fourth stage transistor TS4 including a control electrode connected to the first stage node NS1, a first electrode configured to receive the first clock signal CLK1, and a second electrode connected to the second stage node NS2; a fifth stage transistor TS5 including a control electrode configured to receive the first clock signal CLK1, a first electrode configured to receive a low voltage VGL, and a second electrode connected to the second stage node NS2; a sixth stage transistor TS6 including a control electrode connected to the second stage node NS2, a first electrode configured to receive the high voltage VGH, and a second electrode connected to a third stage node NS3, through which the carry signal (e.g., the first carry signal CR[1]) is output; a seventh stage transistor TS7 including a control electrode connected to a fourth stage node NS4, a first electrode configured to receive the second clock signal CLK2, and a second electrode connected to the third stage node NS3; an eighth stage transistor TS8 including a control electrode configured to receive the low voltage VGL, a first electrode connected to the first stage node NS1, and a second electrode connected to the fourth stage node NS4; a first stage capacitor CS1 including a first electrode configured to receive the high voltage VGH, and a second electrode connected to the second stage node NS2; and a second stage capacitor CS2 including a first electrode connected to the fourth stage node NS4, and a second electrode connected to the third stage node NS3.

In an embodiment, for example, the high voltage VGH may be a voltage having a high voltage level, and the low voltage VGL may be a voltage having a low voltage level.

In an embodiment, for example, in a first period P1, the first stage transistor TS1 may transmit the start signal FLM having a low voltage level to the first stage node NS1 in response to the first clock signal CLK1. Since the eighth stage transistor TS8 is always turned on, the start signal FLM having the low voltage level may be transmitted to the fourth stage node NS4 (i.e., the control electrode of the seventh stage transistor TS7). In addition, the fifth stage transistor TS5 may transmit the low voltage VGL to the second stage node NS2 in response to the first clock signal CLK1. Further, the fourth stage transistor TS4 may transmit the first clock signal CLK1 having a low voltage level to the second stage node NS2 in response to a signal of the first stage node NS1. Therefore, the sixth stage transistor TS6 and the seventh stage transistor TS7 may be turned on. In addition, since the second clock signal CLK2 has a high voltage level, the first carry signal CR[1] having a high voltage level may be output through the third stage node NS3.

In an embodiment, for example, in a second period P2, the fourth stage transistor TS4 may transmit the first clock signal CLK1 having a high voltage level to the second stage node NS2 in response to the signal of the first stage node NS1. Therefore, the sixth stage transistor TS6 may be turned off, the seventh stage transistor TS7 may be turned on, and the first carry signal CR[1] having a low voltage level may be output through the third stage node NS3. The second stage STAGE[2] may receive the first carry signal CR[1] having the low voltage level from the first stage STAGE[1] to start an operation that is similar to the operation of the first stage STAGE[1] in the first period P1.

In an embodiment, for example, in a third period P3, the first stage transistor TS1 may transmit the start signal FLM having a high voltage level to the first stage node NS1 in response to the first clock signal CLK1. Since the eighth stage transistor TS8 is always turned on, the start signal FLM having the high voltage level may be transmitted to the fourth stage node NS4 (i.e., the control electrode of the seventh stage transistor TS7). In addition, the fifth stage transistor TS5 may transmit the low voltage VGL to the second stage node NS2 in response to the first clock signal CLK1 having a low voltage level. Therefore, the sixth stage transistor TS6 may be turned on, the seventh stage transistor TS7 may be turned off, and the first carry signal CR[1] having a high voltage level may be output through the third stage node NS3.

In an embodiment, the first clock signal CLK1 and the second clock signal CLK2 of even-numbered stages (e.g., the second stage STAGE[2] and the fourth stage STAGE[4]) may be interchanged in odd-numbered stages (e.g., the first stage STAGE[1] and the third stage STAGE[3]).

Figure 19:
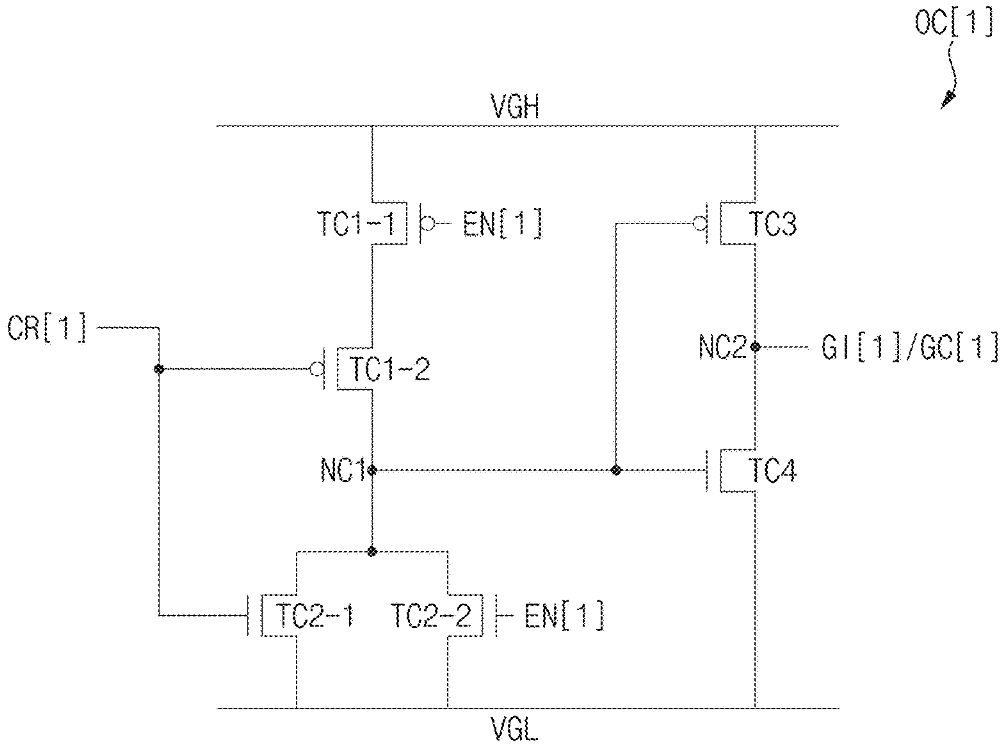
FIG. 19 is a circuit diagram illustrating an example of a first output controller of the gate driver of FIG. 17.

FIG. 19 is a circuit diagram illustrating an example of a first output controller OC[1] of the gate driver 300 of FIG. 17, and FIGS. 20 to 23 are circuit diagrams illustrating an example of an operation of the first output controller OC[1] of FIG. 19.

The output controllers 320 of the gate driver 300 except for the first output controller OC[1] may be substantially the same as the first output controller OC[1].

FIGS. 19 to 23 show that the gate signal output from the first output controller OC[1] has a low voltage level L as an activation level, and the first enable signal EN[1] has a high voltage level H as an activation level.

Referring to FIGS. 19 to 23, the first output controller OC[1] may control a voltage of the first control node NC1 based on the first carry signal CR[1] and the first enable signal EN[1], and output the gate signal (e.g., the first initialization gate signal GI[1] and the first compensation gate signal GC[1]) based on the voltage of the first control node NC1. The first output controller OC[1] may include: a first-first control transistor TC1-1 including a control electrode configured to receive the enable signal (e.g., the first enable signal EN[1]), a first electrode configured to receive a high voltage VGH, and a second electrode connected to a first electrode of a first-second control transistor TC1-2; the first-second control transistor TC1-2 including a control electrode configured to receive the carry signal (e.g., the first carry signal CR[1]), the first electrode connected to the second electrode of the first-first control transistor TC1-1, and a second electrode connected to the first control node NC1; a second-first control transistor TC2-1 including a control electrode configured to receive the carry signal (e.g., the first carry signal CR[1]), a first electrode configured to receive a low voltage VGL, and a second electrode connected to the first control node NC1; a second-second control transistor TC2-2 including a control electrode configured to receive the enable signal (e.g., the first enable signal EN[1]), a first electrode configured to receive the low voltage VGL, and a second electrode connected to the first control node NC1; a third control transistor TC3 including a control electrode connected to the first control node NC1, a first electrode configured to receive the high voltage VGH, and a second electrode connected to a second control node NC2, through which the gate signal (e.g., the first initialization gate signal GI[1] and the first compensation gate signal GC[1]) is output; and a fourth control transistor TC4 including a control electrode connected to the first control node NC1, a first electrode configured to receive the low voltage VGL, and a second electrode connected to the second control node NC2.

In an embodiment, the first-first control transistor TC1-1, the first-second control transistor TC1-2, and the third control transistor TC3 may be implemented as PMOS transistors. In an embodiment, the second-first control transistor TC2-1, the second-second control transistor TC2-2, and the fourth control transistor TC4 may be implemented as NMOS transistors.

Figure 20:
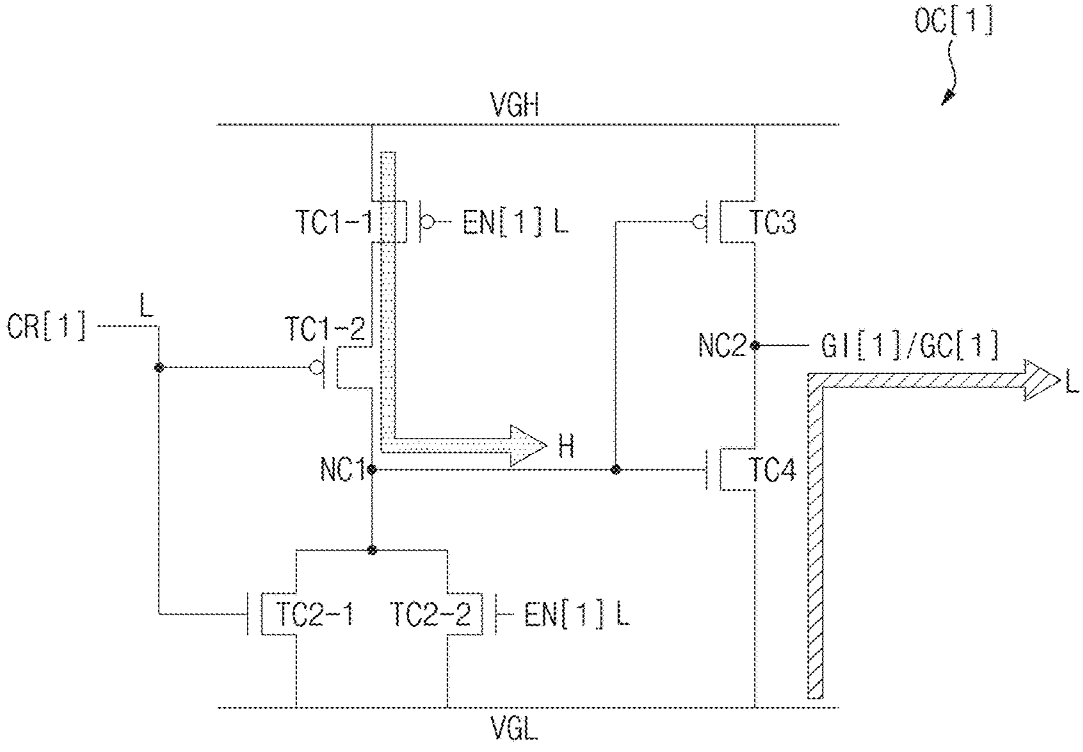
FIGS. 20 to 23 are circuit diagrams illustrating an example of an operation of the first output controller of FIG. 19.

In an embodiment, for example, as shown in FIG. 20, it will be assumed that the first carry signal CR[1] having the low voltage level L and the first enable signal EN[1] having the low voltage level L are applied to the first output controller OC[1]. In this case, the first-first control transistor TC1-1 and the first-second control transistor TC1-2 may be turned on, and the second-first control transistor TC2-1 and the second-second control transistor TC2-2 may be turned off. Therefore, each of the first-first control transistor TC1-1 and the first-second control transistor TC1-2 may apply the high voltage VGH having the high voltage level H to the first control node NC1. In addition, the fourth control transistor TC4 may be turned on, and the third control transistor TC3 may be turned off. Therefore, the fourth control transistor TC4 may apply the low voltage VGL having the low voltage level L to the second control node NC2. Accordingly, the first output controller OC[1] may output the first initialization gate signal GI[1] and the first compensation gate signal GC[1] having the low voltage levels L.

Figure 21:
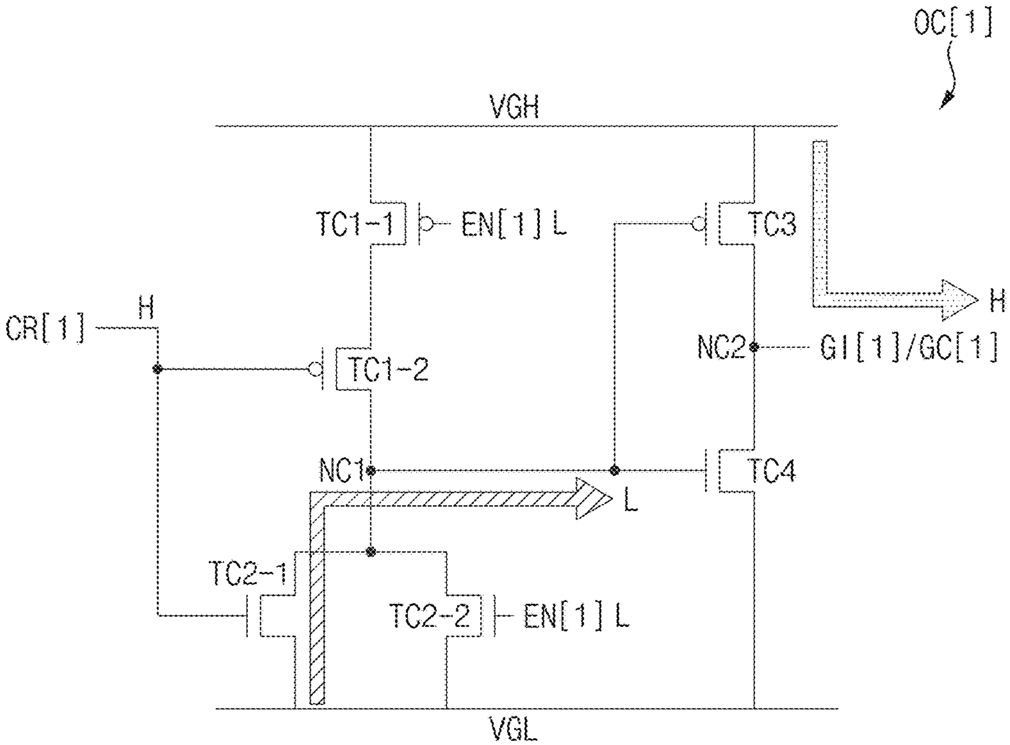

In an embodiment, for example, as shown in FIG. 21, it will be assumed that the first carry signal CR[1] having the high voltage level H and the first enable signal EN[1] having the low voltage level L are applied to the first output controller OC[1]. In this case, the first-second control transistor TC1-2 and the second-second control transistor TC2-2 may be turned off, and the first-first control transistor TC1-1 and the second-first control transistor TC2-1 may be turned on. Therefore, the second-first control transistor TC2-1 may apply the low voltage VGL having the low voltage level L to the first control node NC1. In addition, the fourth control transistor TC4 may be turned off, and the third control transistor TC3 may be turned on. Therefore, the third control transistor TC3 may apply the high voltage VGH having the high voltage level H to the second control node NC2. Accordingly, the first output controller OC[1] may output the first initialization gate signal GI[1] and the first compensation gate signal GC[1] having the high voltage levels H.

Figure 22:
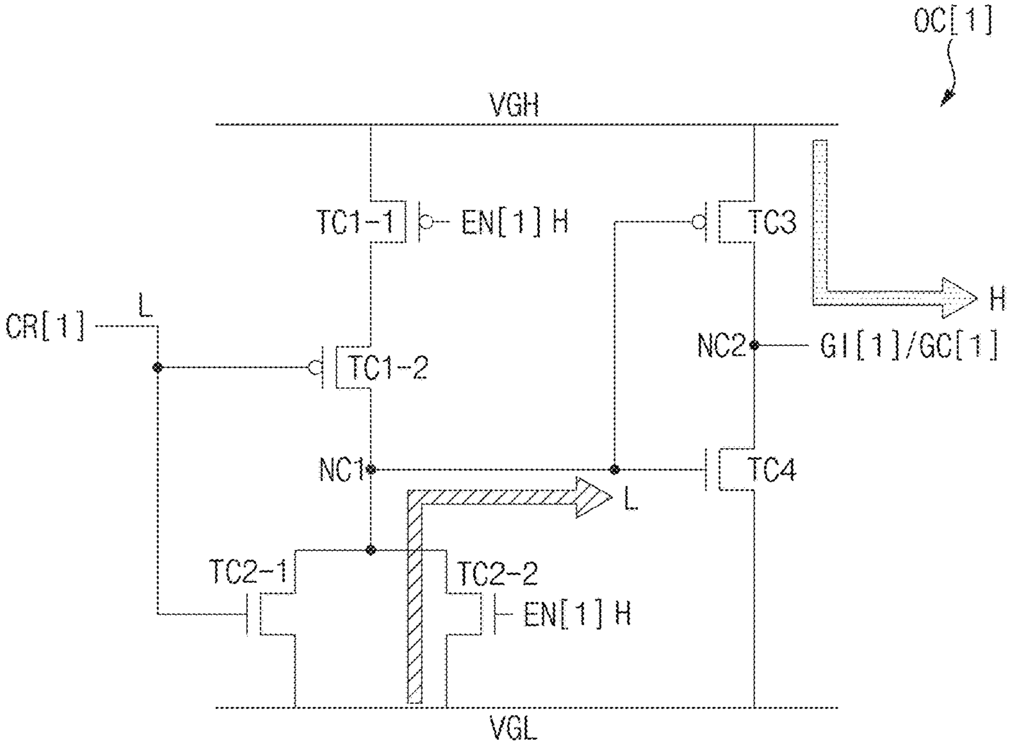

In an embodiment, for example, as shown in FIG. 22, it will be assumed that the first carry signal CR[1] having the low voltage level L and the first enable signal EN[1] having the high voltage level H are applied to the first output controller OC[1]. In this case, the first-first control transistor TC1-1 and the second-first control transistor TC2-1 may be turned off, and the first-second control transistor TC1-2 and the second-second control transistor TC2-2 may be turned on. Therefore, the second-second control transistor TC2-2 may apply the low voltage VGL having the low voltage level L to the first control node NC1. In addition, the fourth control transistor TC4 may be turned off, and the third control transistor TC3 may be turned on. Therefore, the third control transistor TC3 may apply the high voltage VGH having the high voltage level H to the second control node NC2. Accordingly, the first output controller OC[1] may output the first initialization gate signal GI[1] and the first compensation gate signal GC[1] having the high voltage levels H.

Figure 23:
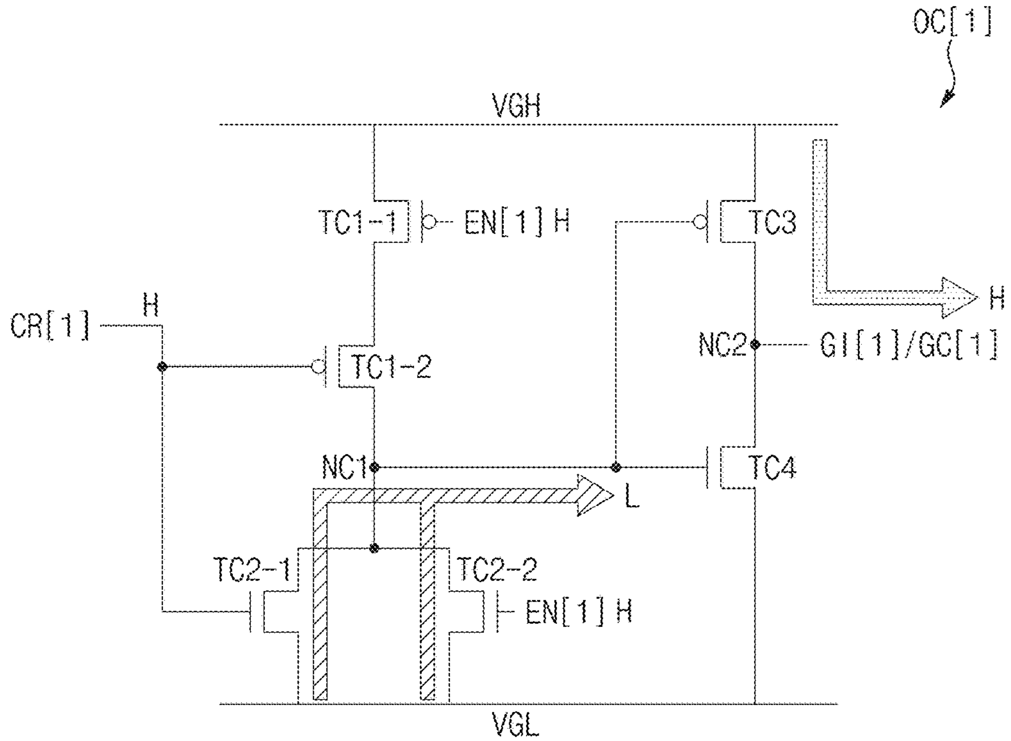

In an embodiment, for example, as shown in FIG. 23, it will be assumed that the first carry signal CR[1] having the high voltage level H and the first enable signal EN[1] having the high voltage level H are applied to the first output controller OC[1]. In this case, the first-first control transistor TC1-1 and the first-second control transistor TC1-2 may be turned off, and the second-first control transistor TC2-1 and the second-second control transistor TC2-2 may be turned on. Therefore, each of the second-first control transistor TC2-1 and the second-second control transistor TC2-2 may apply the low voltage VGL having the low voltage level L to the first control node NC1. In addition, the fourth control transistor TC4 may be turned off, and the third control transistor TC3 may be turned on. Therefore, the third control transistor TC3 may apply the high voltage VGH having the high voltage level H to the second control node NC2. Accordingly, the first output controller OC[1] may output the first initialization gate signal GI[1] and the first compensation gate signal GC[1] having the high voltage levels H.

Figure 24:
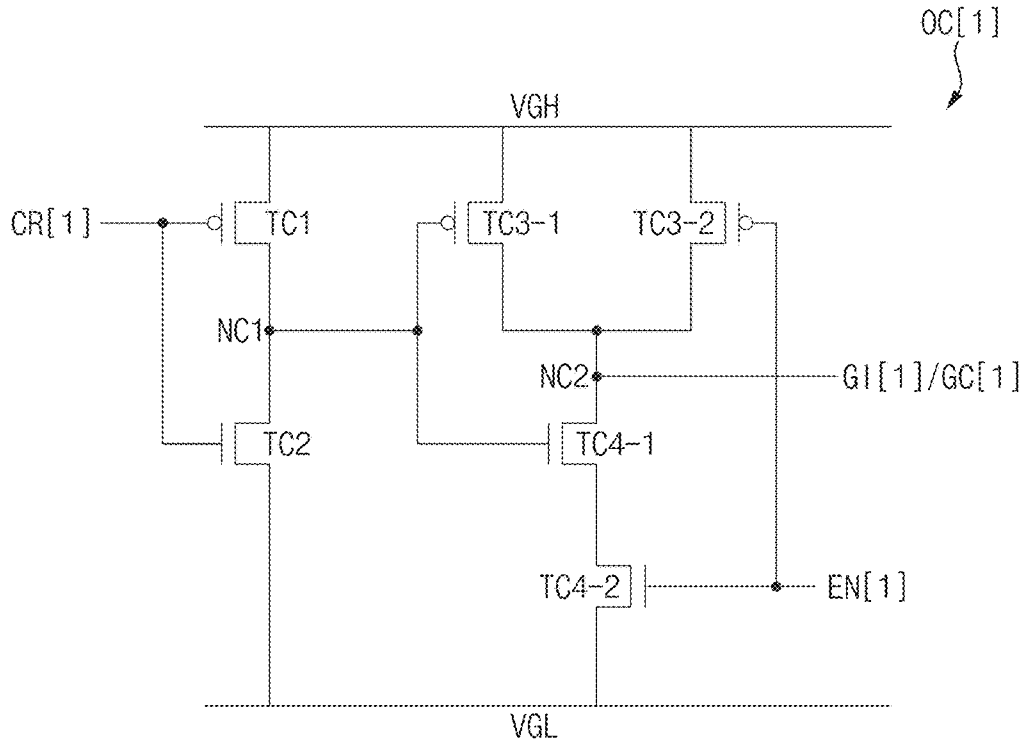
FIG. 24 is a circuit diagram illustrating a first output controller of a gate driver of a display device according to embodiments.

FIG. 24 is a circuit diagram illustrating a first output controller OC[1] of a gate driver 300 of a display device according to embodiments, and FIGS. 25 to 28 are circuit diagrams illustrating an example of an operation of the first output controller OC[1] of FIG. 24.

Since a display device according to the present embodiments has a configuration that is substantially identical to the configuration of the display device of FIG. 17 except for the output controller 320, the same reference numbers and reference symbols will be used for the same or similar components, and redundant descriptions will be omitted.

The output controllers 320 of the gate driver 300 except for the first output controller OC[1] may be substantially the same as the first output controller OC[1].

FIGS. 24 to 28 show that the gate signal output from the first output controller OC[1] has a low voltage level L as an activation level, and the first enable signal EN[1] has the low voltage level L as an activation level.

Referring to FIGS. 24 to 28, the first output controller OC[1] may control a voltage of the first control node NC1 based on the first carry signal CR[1], and output the gate signal (e.g., the first initialization gate signal GI[1] and the first compensation gate signal GC[1]) based on the voltage of the first control node NC1 and the first enable signal EN[1]. The first output controller OC[1] may include: a first control transistor TC1 including a control electrode configured to receive the carry signal (e.g., the first carry signal CR[1]), a first electrode configured to receive a high voltage VGH, and a second electrode connected to the first control node NC1; a second control transistor TC2 including a control electrode configured to receive the carry signal (e.g., the first carry signal CR[1]), a first electrode configured to receive a low voltage VGL, and a second electrode connected to the first control node NC1; a third-first control transistor TC3-1 including a control electrode connected to the first control node NC1, a first electrode configured to receive the high voltage VGH, and a second electrode connected to a second control node NC2, through which the gate signal (e.g., the first initialization gate signal GI[1] and the first compensation gate signal GC[1]) is output; a third-second control transistor TC3-2 including a control electrode configured to receive the enable signal (e.g., the first enable signal EN[1]), a first electrode configured to receive the high voltage VGH, and a second electrode connected to the second control node NC2; a fourth-first control transistor TC4-1 including a control electrode connected to the first control node NC1, a first electrode connected to a second electrode of a fourth-second control transistor TC4-2, and a second electrode connected to the second control node NC2; and the fourth-second control transistor TC4-2 including a control electrode configured to receive the enable signal (e.g., the first enable signal EN[1]), a first electrode configured to receive the low voltage VGL, and the second electrode connected to the first electrode of the fourth-first control transistor TC4-1.

In an embodiment, the first control transistor TC1, the third-first control transistor TC3-1, and the third-second control transistor TC3-2 may be implemented as PMOS transistors. In an embodiment, the second control transistor TC2, the fourth-first control transistor TC4-1, and the fourth-second control transistor TC4-2 may be implemented as NMOS transistors.

Figure 25:
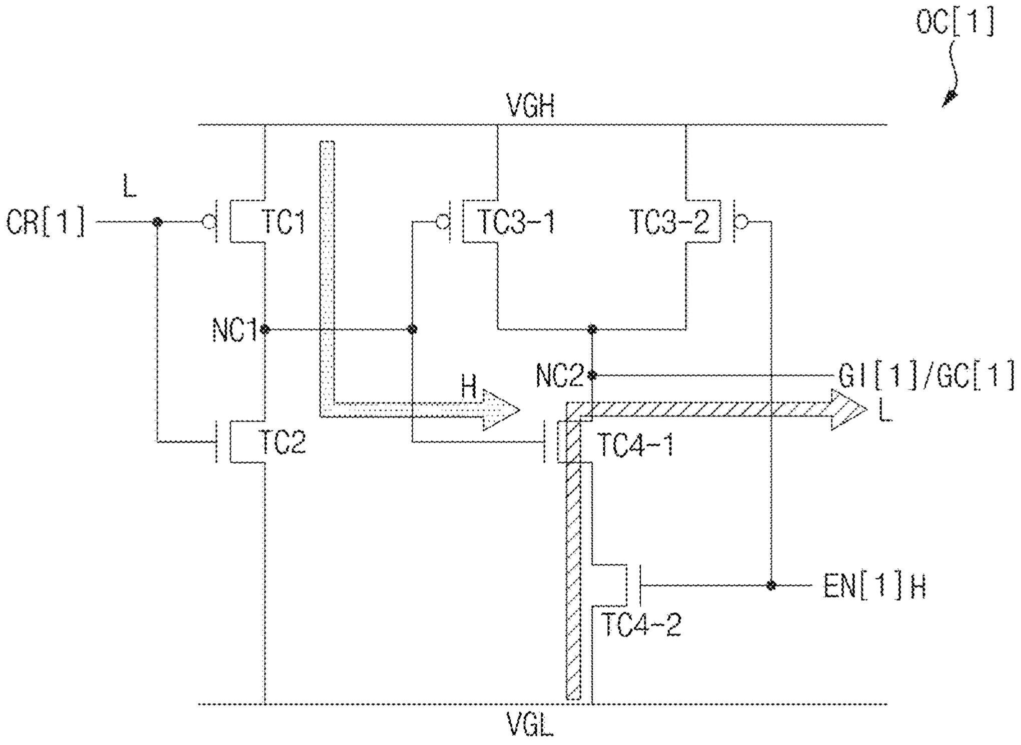
FIGS. 25 to 28 are circuit diagrams illustrating an example of an operation of the first output controller of FIG. 24.

In an embodiment, for example, as shown in FIG. 25, it will be assumed that the first carry signal CR[1] having the low voltage level L and the first enable signal EN[1] having a high voltage level H are applied to the first output controller OC[1]. In this case, the first control transistor TC1 may be turned on, and the second control transistor TC2 may be turned off. Therefore, the first control transistor TC1 may apply the high voltage VGH having the high voltage level H to the first control node NC1. In addition, the fourth-first control transistor TC4-1 and the fourth-second control transistor TC4-2 may be turned on, and the third-first control transistor TC3-1 and the third-second control transistor TC3-2 may be turned off. Therefore, each of the fourth-first control transistor TC4-1 and the fourth-second control transistor TC4-2 may apply the low voltage VGL having the low voltage level L to the second control node NC2. Accordingly, the first output controller OC[1] may output the first initialization gate signal GI[1] and the first compensation gate signal GC[1] having the low voltage levels L.

Figure 26:
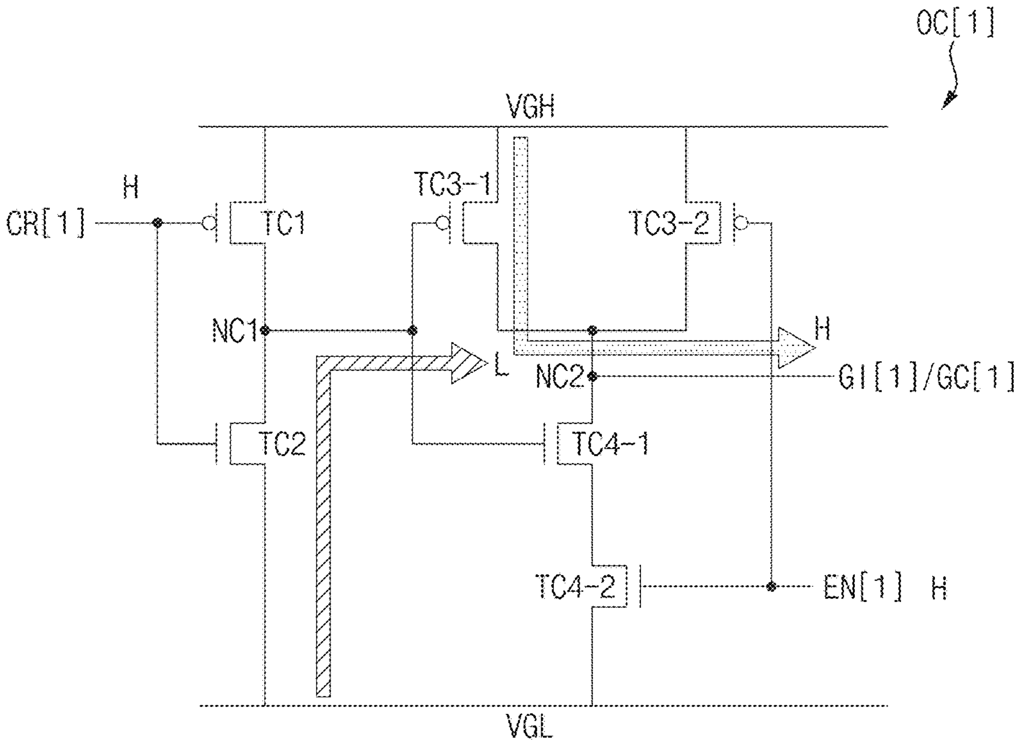

In an embodiment, for example, as shown in FIG. 26, it will be assumed that the first carry signal CR[1] having the high voltage level H and the first enable signal EN[1] having the high voltage level H are applied to the first output controller OC[1]. In this case, the first control transistor TC1 may be turned off, and the second control transistor TC2 may be turned on. Therefore, the second control transistor TC2 may apply the low voltage VGL having the low voltage level L to the first control node NC1. In addition, the third-second control transistor TC3-2 and the fourth-first control transistor TC4-1 may be turned off, and the third-first control transistor TC3-1 and the fourth-second control transistor TC4-2 may be turned on. Therefore, the third-first control transistor TC3-1 may apply the high voltage VGH having the high voltage level H to the second control node NC2. Accordingly, the first output controller OC[1] may output the first initialization gate signal GI[1] and the first compensation gate signal GC[1] having the high voltage levels H.

Figure 27:
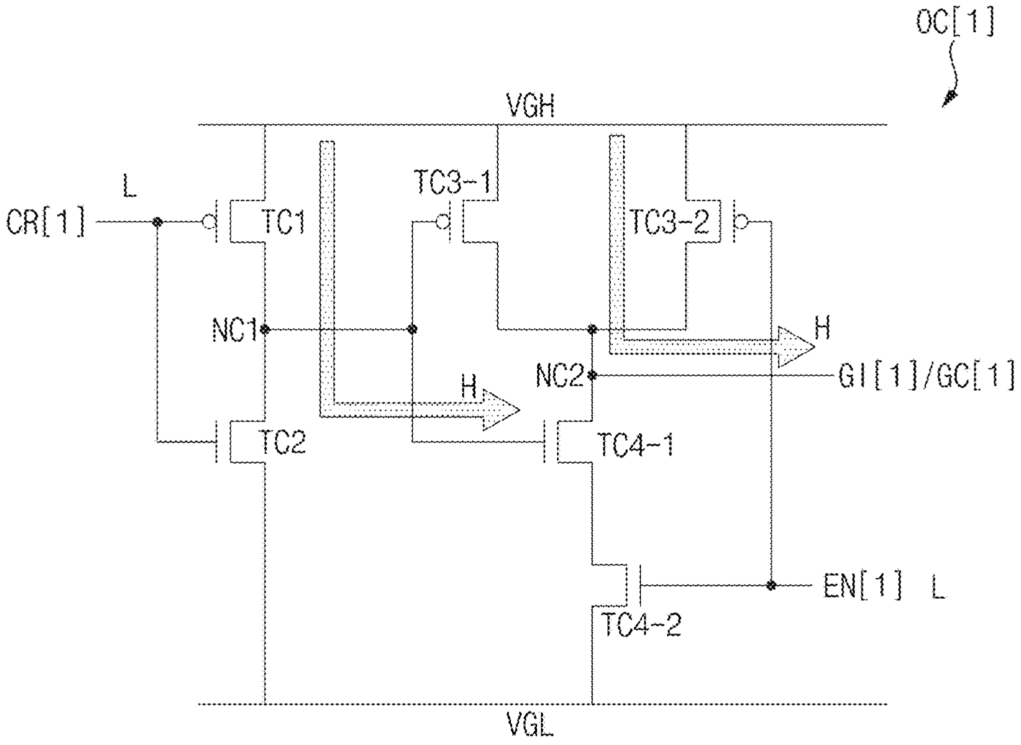

In an embodiment, for example, as shown in FIG. 27, it will be assumed that the first carry signal CR[1] having the low voltage level L and the first enable signal EN[1] having the low voltage level L are applied to the first output controller OC[1]. In this case, the first control transistor TC1 may be turned on, and the second control transistor TC2 may be turned off. Therefore, the first control transistor TC1 may apply the high voltage VGH having the high voltage level H to the first control node NC1. In addition, the third-first control transistor TC3-1 and the fourth-second control transistor TC4-2 may be turned off, and the third-second control transistor TC3-2 and the fourth-first control transistor TC4-1 may be turned on. Therefore, the third-second control transistor TC3-2 may apply the high voltage VGH having the high voltage level H to the second control node NC2. Accordingly, the first output controller OC[1] may output the first initialization gate signal GI[1] and the first compensation gate signal GC[1] having the high voltage levels H.

Figure 28:
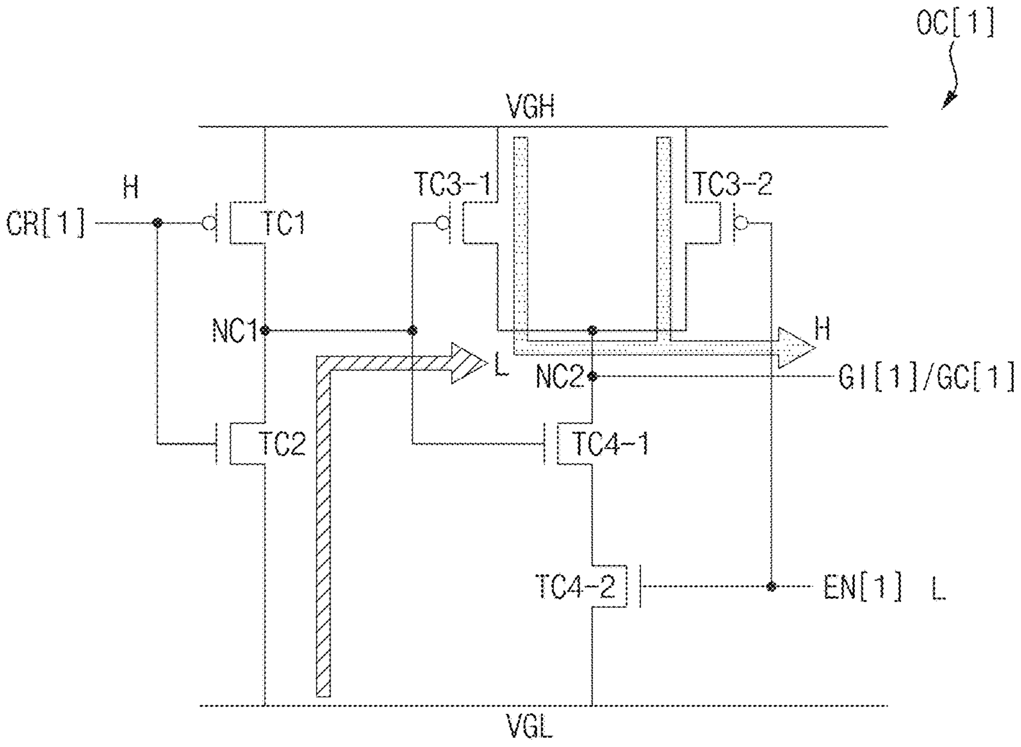

In an embodiment, for example, as shown in FIG. 28, it will be assumed that the first carry signal CR[1] having the high voltage level H and the first enable signal EN[1] having the low voltage level L are applied to the first output controller OC[1]. In this case, the first control transistor TC1 may be turned off, and the second control transistor TC2 may be turned on. Therefore, the second control transistor TC2 may apply the low voltage VGL having the low voltage level L to the first control node NC1. In addition, the fourth-first control transistor TC4-1 and the fourth-second control transistor TC4-2 may be turned off, and the third-first control transistor TC3-1 and the third-second control transistor TC3-2 may be turned on. Therefore, each of the third-first control transistor TC3-1 and the third-second control transistor TC3-2 may apply the high voltage VGH having the high voltage level H to the second control node NC2. Accordingly, the first output controller OC[1] may output the first initialization gate signal GI[1] and the first compensation gate signal GC[1] having the high voltage levels H.

Figure 29:
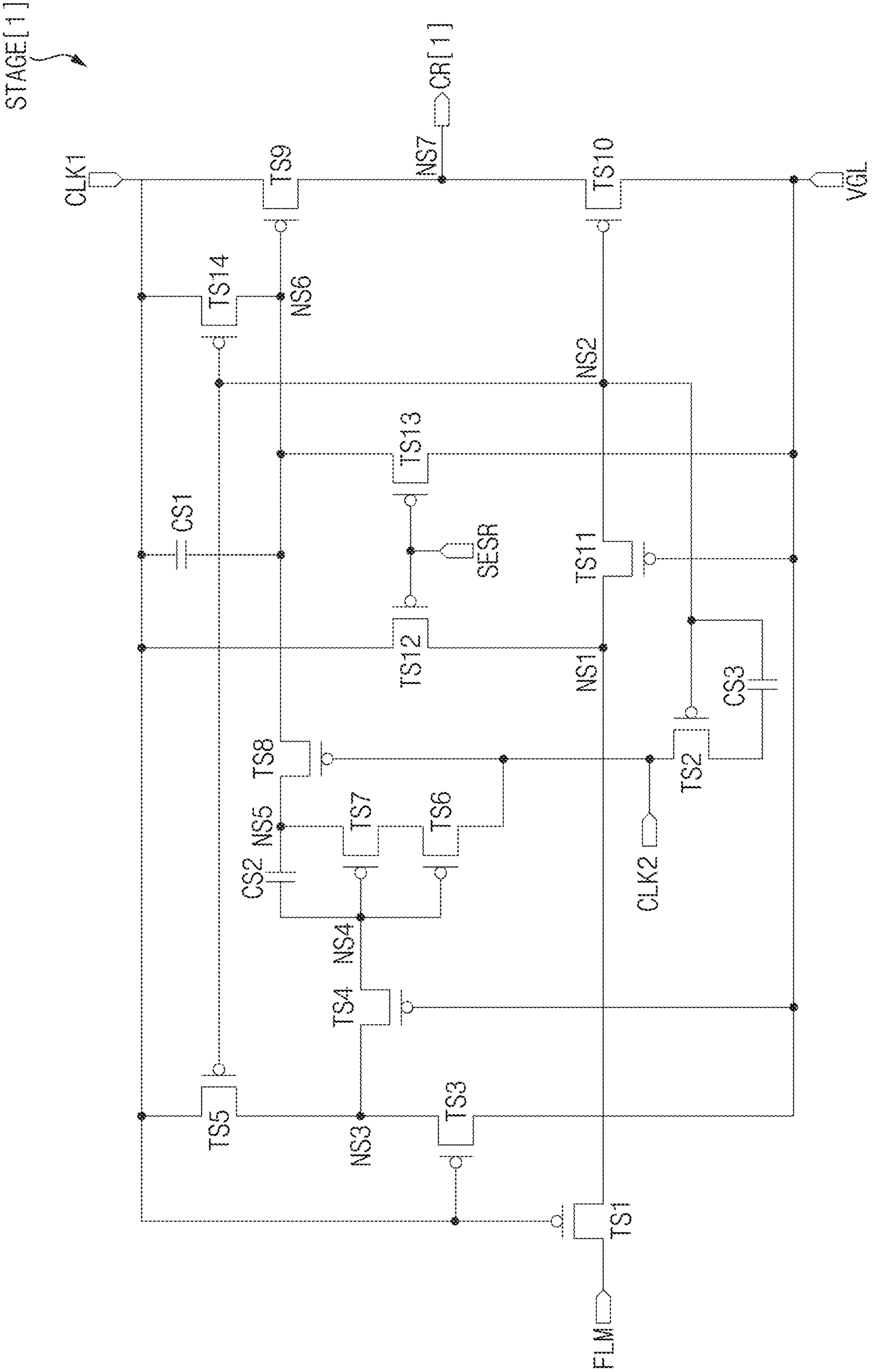
FIG. 29 is a circuit diagram illustrating a first stage of a gate driver of a display device according to embodiments.
Figure 30:
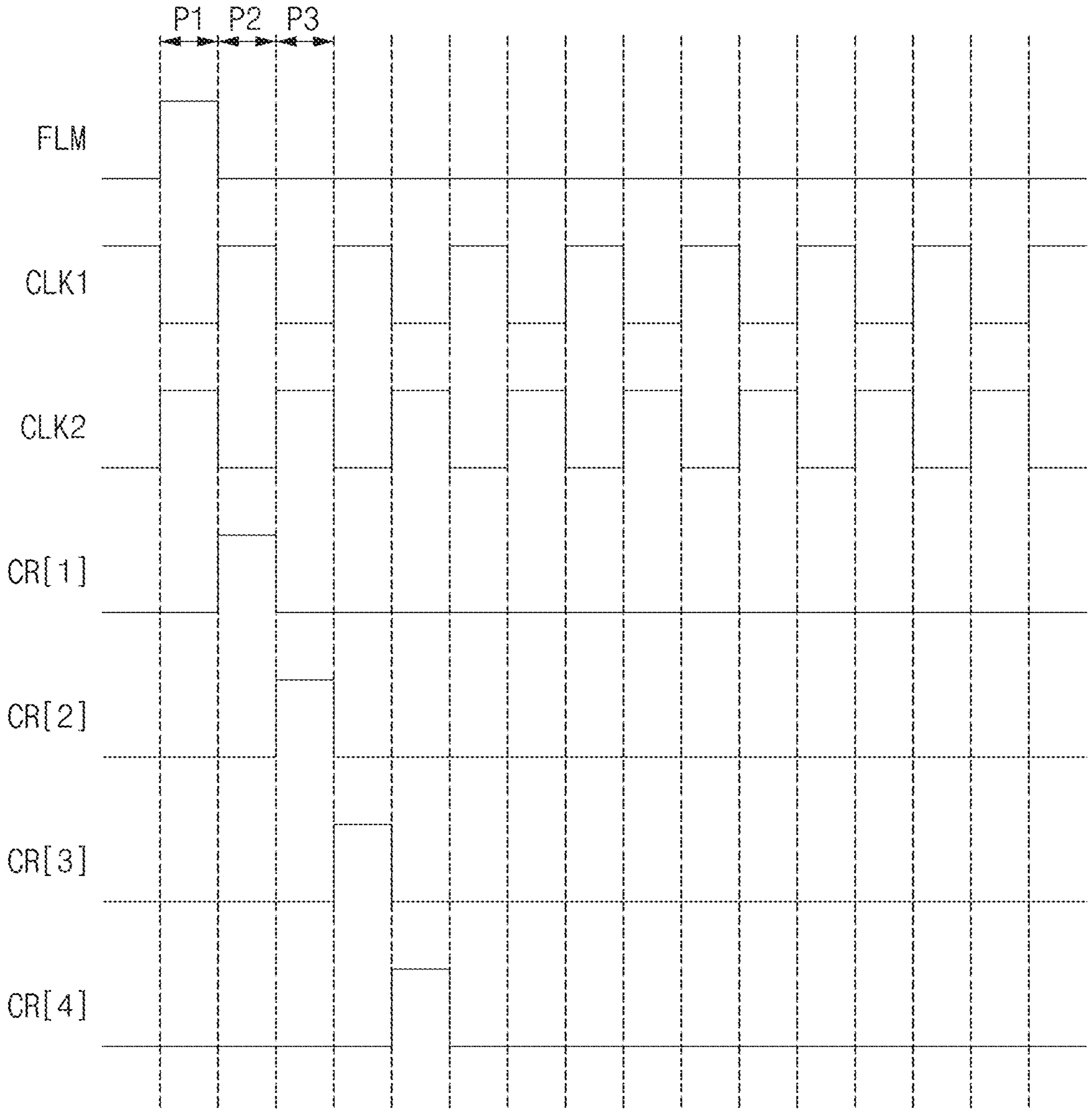
FIG. 30 is a timing diagram illustrating an example of an operation of a stage of the display device of FIG. 29.

FIG. 29 is a circuit diagram illustrating a first stage STAGE[1] of a gate driver 300 of a display device according to embodiments, and FIG. 30 is a timing diagram illustrating an example of an operation of a stage 310 of the display device of FIG. 29.

The stages 310 of the gate driver 300 except for the first stage STAGE[1] may be substantially the same as the first stage STAGE[1] except for applied signals.

FIGS. 29 and 30 show that the gate signal output from the first output controller OC[1] has a low voltage level as an activation level.

Since a display device according to the present embodiments has a configuration that is substantially identical to the configuration of the display device of FIG. 1 except for the gate driver 300, the same reference numbers and reference symbols will be used for the same or similar components, and redundant descriptions will be omitted.

Referring to FIGS. 3, 29, and 30, the first stage STAGE[1] may include: a first stage transistor TS1 including a control electrode configured to receive a first clock signal CLK1, a first electrode configured to receive an input signal (e.g., a start signal FLM), and a second electrode connected to a first stage node NS1; a second stage transistor TS2 including a control electrode connected to a second stage node NS2, a first electrode configured to receive a second clock signal CLK2, and a second electrode connected to a first electrode of a third stage capacitor CS3; a third stage transistor TS3 including a control electrode configured to receive the first clock signal CLK1, a first electrode configured to receive a low voltage VGL, and a second electrode connected to a third stage node NS3; a fourth stage transistor TS4 including a control electrode configured to receive the low voltage VGL, a first electrode connected to the third stage node NS3, and a second electrode connected to a fourth stage node NS4; a fifth stage transistor TS5 including a control electrode connected to the second stage node NS2, a first electrode configured to receive the first clock signal CLK1, and a second electrode connected to the third stage node NS3; a sixth stage transistor TS6 including a control electrode connected to the fourth stage node NS4, a first electrode configured to receive the second clock signal CLK2, and a second electrode connected to a first electrode of a seventh stage transistor TS7; the seventh stage transistor TS7 including a control electrode connected to the fourth stage node NS4, the first electrode connected to the second electrode of the sixth stage transistor TS6, and a second electrode connected to a fifth stage node NS5; an eighth stage transistor TS8 including a control electrode configured to receive the second clock signal CLK2, a first electrode connected to the fifth stage node NS5, and a second electrode connected to a sixth stage node NS6; a ninth stage transistor TS9 including a control electrode connected to the sixth stage node NS6, a first electrode configured to receive the first clock signal CLK1, and a second electrode connected to a seventh stage node NS7, through which the carry signal (e.g., the first carry signal CR[1]) is output; a tenth stage transistor TS10 including a control electrode connected to the second stage node NS2, a first electrode configured to receive the low voltage VGL, and a second electrode connected to the seventh stage node NS7; an eleventh stage transistor TS11 including a control electrode configured to receive the low voltage VGL, a first electrode connected to the first stage node NS1, and a second electrode connected to the second stage node NS2; a first stage capacitor CS1 including a first electrode configured to receive the first clock signal CLK1, and a second electrode connected to the sixth stage node NS6; a second stage capacitor CS2 including a first electrode connected to the fourth stage node NS4, and a second electrode connected to the fifth stage node NS5; and the third stage capacitor CS3 including the first electrode connected to the second electrode of the second stage transistor TS2, and a second electrode connected to the second stage node NS2. The first stage STAGE[1] may include: a twelfth stage transistor TS12 including a control electrode configured to receive an initialization signal SESR, a first electrode configured to receive the first clock signal CLK1, and a second electrode connected to the first stage node NS1; a thirteenth stage transistor TS13 including a control electrode configured to receive the initialization signal SESR, a first electrode configured to receive the low voltage VGL, and a second electrode connected to the sixth stage node NS6; and a fourteenth stage transistor TS14 including a control electrode connected to the second stage node NS2, a first electrode configured to receive the first clock signal CLK1, and a second electrode connected to the sixth stage node NS6.

In an embodiment, for example, the high voltage VGH may be a voltage having a high voltage level, and the low voltage VGL may be a voltage having a low voltage level.

In an embodiment, for example, in a first period P1, the first stage transistor TS1 may transmit the start signal FLM having a high voltage level to the first stage node NS1 in response to the first clock signal CLK1. Since the eleventh stage transistor TS11 is always turned on, the start signal FLM having the high voltage level may be transmitted to the second stage node NS2 (i.e., the control electrode of the tenth stage transistor TS10). Therefore, the tenth stage transistor TS10 may be turned off. In addition, the third stage transistor TS3 may transmit the low voltage VGL to the third stage node NS3 in response to the first clock signal CLK1. Since the fourth stage transistor TS4 is always turned on, the low voltage VGL may be transmitted to the fourth stage node NS4. In addition, the sixth and seventh stage transistors TS6 and TS7 may transmit the second clock signal CLK2 to the fifth stage node NS5 in response to a signal of the fourth stage node NS4.

In an embodiment, for example, in a second period P2, the sixth to eighth stage transistors TS6, TS7, and TS8 may transmit the second clock signal CLK2 having a low voltage level to the sixth stage node NS6 in response to a signal of the second clock signal CLK2. Therefore, the ninth stage transistor TS9 may be turned on, the tenth stage transistor TS10 may be turned off, and the first carry signal CR[1] having a high voltage level may be output through the seventh stage node NS7. The second stage STAGE[2] may receive the first carry signal CR[1] having the high voltage level from the first stage STAGE[1] to start an operation that is similar to the operation of the first stage STAGE[1] in the first period P1.

In an embodiment, for example, in third period P3, the first stage transistor TS1 may transmit the start signal FLM having a low voltage level to the first stage node NS1 in response to the first clock signal CLK1. Since the eleventh stage transistor TS11 is always turned on, the start signal FLM having the low voltage level may be transmitted to the second stage node NS2 (i.e., the control electrode of the tenth stage transistor TS10). In addition, the fourteenth stage transistor TS14 may transmit the first clock signal CLK1 having a low voltage level to the sixth stage node NS6 (i.e., the control electrode of the ninth stage transistor TS9) in response to a signal of the second stage node NS2. Therefore, the ninth stage transistor TS9 and the tenth stage transistor TS10 may be turned on, and the first carry signal CR[1] having a low voltage level may be output through the seventh stage node NS7.

In an embodiment, the first clock signal CLK1 and the second clock signal CLK2 of even-numbered stages (e.g., the second stage STAGE[2] and the fourth stage STAGE[4]) may be interchanged in odd-numbered stages (e.g., the first stage STAGE[1] and the third stage STAGE[3]).

Figure 31:
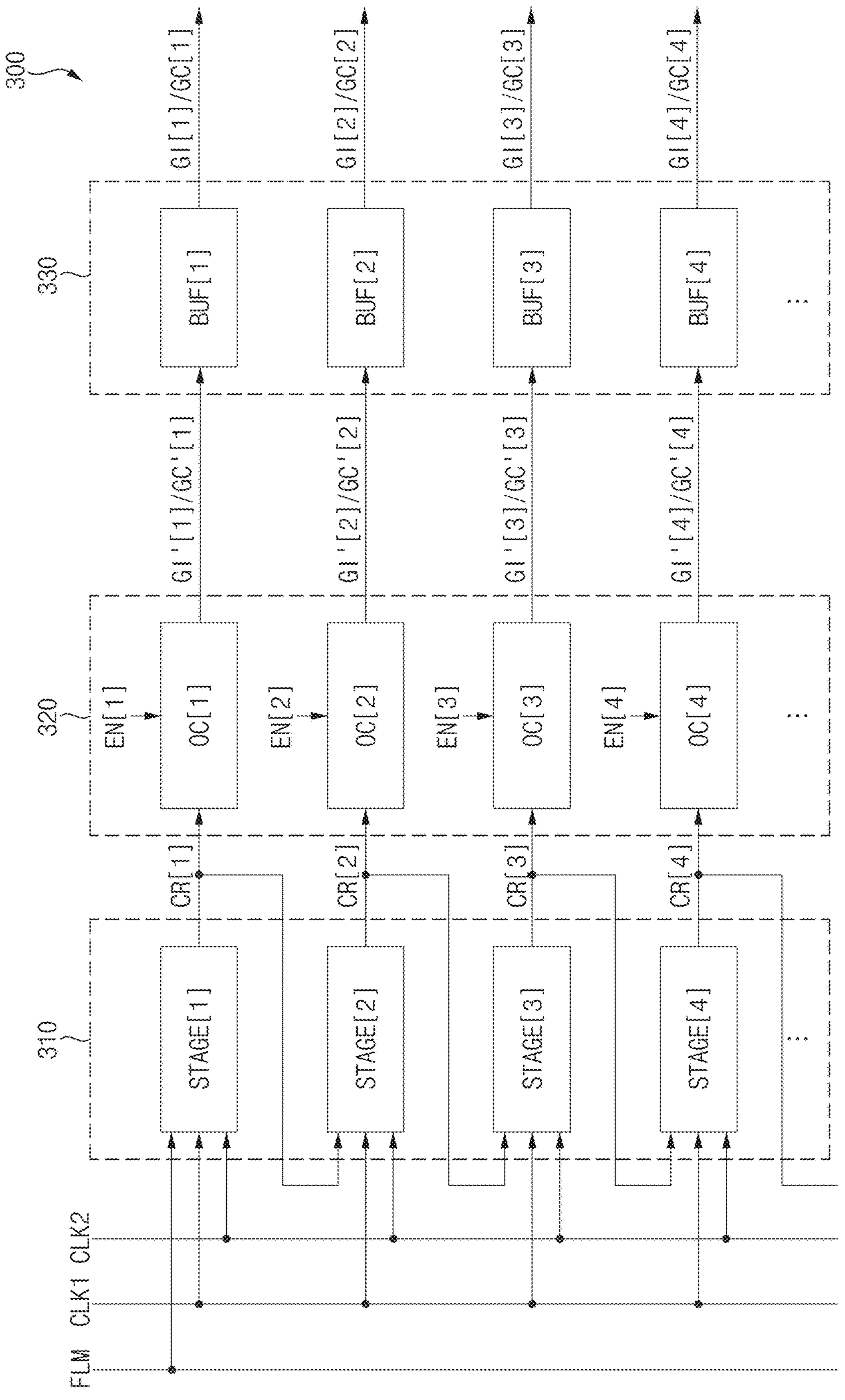
FIG. 31 is a block diagram illustrating a gate driver according to embodiments.

FIG. 31 is a block diagram illustrating a gate driver 300 according to embodiments.

Since a display device according to the present embodiments has a configuration that is substantially identical to the configuration of the display device of FIG. 1 except for a buffer 330, the same reference numbers and reference symbols will be used for the same or similar components, and redundant descriptions will be omitted.

In FIG. 31, gate signals received by the buffer 330 may be denoted as GI'[1], GI'[2], GI'[3], GI'[4], GC'[1], GC'[2], GC'[3], and GC'[4], and gate signals output from the buffer 330 may be denoted as GI[1], GI[2], GI[3], GI[4], GC[1], GC[2], GC[3], and GC[4].

Referring to FIG. 31, the gate driver 300 may further include a buffer 330 configured to receive and output the gate signal. In an embodiment, for example, a first buffer BUF[1] may receive the gate signal from the first output controller OC[1] and output the gate signal. In an embodiment, for example, a second buffer BUF[2] may receive the gate signal from a second output controller OC[2] and output the gate signal. In an embodiment, for example, a third buffer BUF[3] may receive and output a gate signal from a third output controller OC[3] and output the gate signal. In an embodiment, for example, a fourth buffer BUF[4] may receive and output a gate signal from a fourth output controller OC[4] and output the gate signal.

Figure 32:
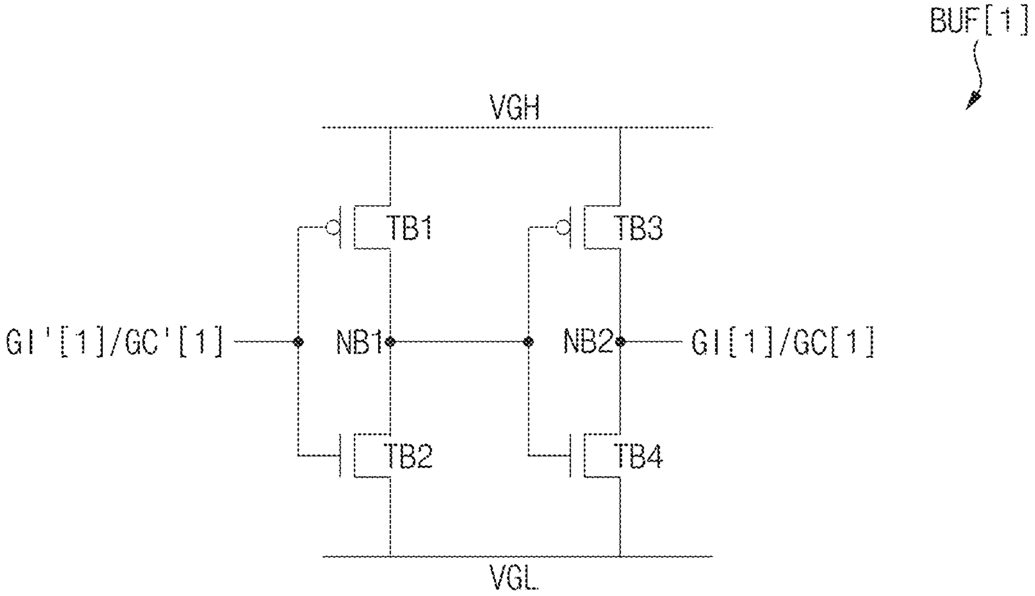
FIG. 32 is a circuit diagram illustrating an example of a first buffer of FIG. 31.

FIG. 32 is a circuit diagram illustrating an example of a first buffer BUF[1] of FIG. 31.

The buffers 330 of the gate driver 300 except for the first buffer BUF[1] may be substantially the same as the first buffer BUF[1] except for applied signals.

Referring to FIG. 32, the first buffer BUF[1] may include: a first buffer transistor TB1 including a control electrode configured to receive a gate signal (e.g., GI'[1] and GC'[1]), a first electrode configured to receive a high voltage VGH, and a second electrode connected to a first buffer node NB1; a second buffer transistor TB2 including a control electrode configured to receive the gate signal (e.g., GI'[1] and GC'[1]), a first electrode configured to receive a low voltage VGL, and a second electrode connected to the first buffer node NB1; a third buffer transistor TB3 including a control electrode connected to the first buffer node NB1, a first electrode configured to receive the high voltage VGH, and a second electrode connected to a second buffer node NB2, through which the gate signal (e.g., GI[1] and GC[1]) is output; and a fourth buffer transistor TB4 including a control electrode connected to the first buffer node NB1, a first electrode configured to receive the low voltage VGL, and a second electrode connected to the second buffer node NB2.

Figure 33:
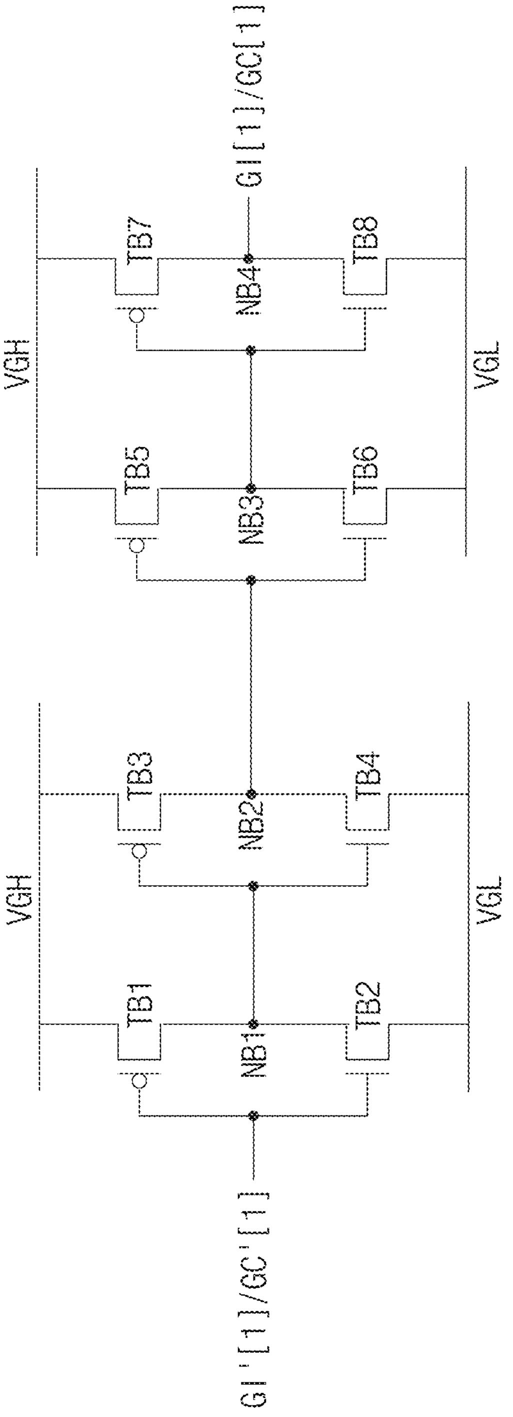
FIG. 33 is a circuit diagram illustrating a first buffer of a display device according to embodiments.

FIG. 33 is a circuit diagram illustrating a first buffer (BUF[1]) of a display device according to embodiments.

Since a display device according to the present embodiments has a configuration that is substantially identical to the configuration of the display device of FIG. 31 except for the buffer 330, the same reference numbers and reference symbols will be used for the same or similar components, and redundant descriptions will be omitted.

The buffers 330 of the gate driver 300 except for the first buffer BUF[1] may be substantially the same as the first buffer BUF[1] except for applied signals.

Referring to FIG. 33, the first buffer BUF[1] may include: a first buffer transistor TB1 including a control electrode configured to receive a gate signal (e.g., GI'[1] and GC'[1]), a first electrode configured to receive a high voltage VGH, and a second electrode connected to a first buffer node NB1; a second buffer transistor TB2 including a control electrode configured to receive the gate signal (e.g., GI'[1] and GC'[1]), a first electrode configured to receive a low voltage VGL, and a second electrode connected to the first buffer node NB1; a third buffer transistor TB3 including a control electrode connected to the first buffer node NB1, a first electrode configured to receive the high voltage VGH, and a second electrode connected to a second buffer node NB2; a fourth buffer transistor TB4 including a control electrode connected to the first buffer node NB1, a first electrode configured to receive the low voltage VGL, and a second electrode connected to the second buffer node NB2; a fifth buffer transistor TB5 including a control electrode connected to the second buffer node NB2, a first electrode configured to receive the high voltage VGH, and a second electrode connected to a third buffer node NB3; a sixth buffer transistor TB6 including a control electrode connected to the second buffer node NB2, a first electrode configured to receive the low voltage VGL, and a second electrode connected to the third buffer node NB3; a seventh buffer transistor TB7 including a control electrode connected to the third buffer node NB3, a first electrode configured to receive the high voltage VGH, and a second electrode connected to a fourth buffer node NB4, through which the gate signal (e.g., GI[1] and GC[1]) is output; and an eighth buffer transistor TB8 including a control electrode connected to the third buffer node NB3, a first electrode configured to receive the low voltage VGL, and a second electrode connected to the fourth buffer node NB4.

Although the buffer 330 has been illustrated in the present embodiment as being configured in one stage (i.e., FIG. 32) or two stages (i.e., FIG. 33), the present disclosure is not limited thereto.

Figure 34:
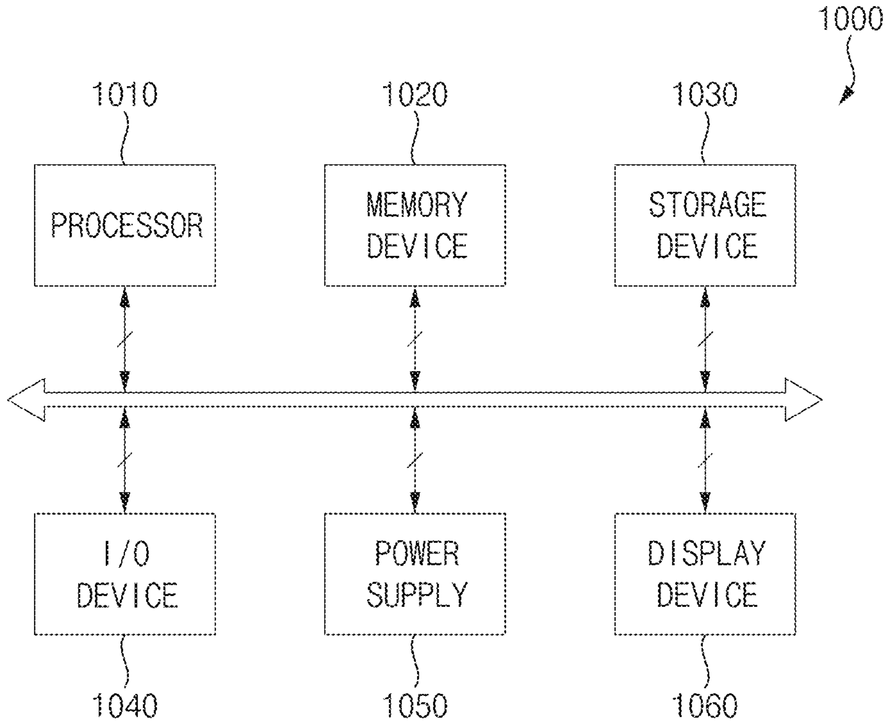
FIG. 34 is a block diagram illustrating an electronic device according to embodiments.
Figure 35:
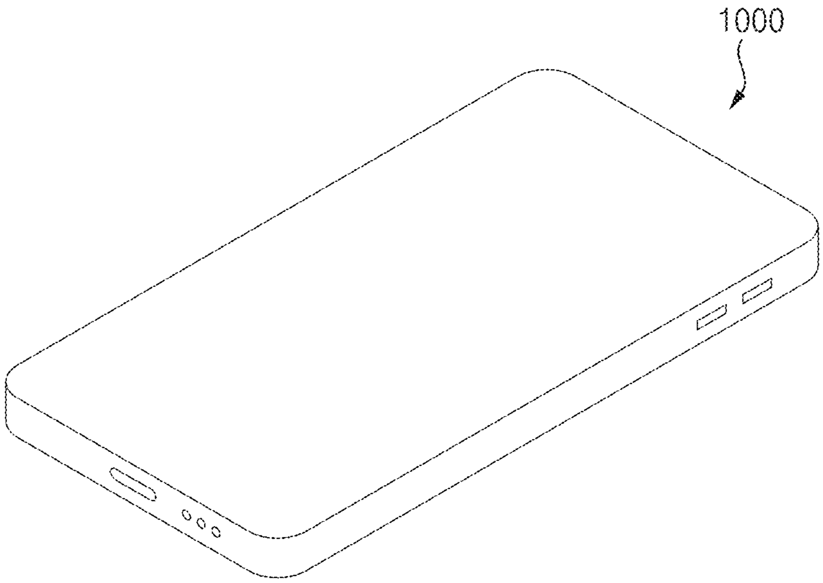
FIG. 35 is a diagram illustrating an example in which the electronic device of FIG. 34 is implemented as a smart phone.

FIG. 34 is a block diagram illustrating an electronic device 1000 according to embodiments, and FIG. 35 is a diagram illustrating an example in which the electronic device 1000 of FIG. 34 is implemented as a smart phone.

Referring to FIGS. 34 and 35, the electronic device 1000 may include a processor 1010, a memory device 1020, a storage device 1030, an input/output ("I/O") device 1040, a power supply 1050, and a display device 1060. Here, the display device 1060 may be the display device of FIG. 1. In addition, the electronic device 1000 may further include a plurality of ports for communicating with a video card, a sound card, a memory card, a universal serial bus ("USB") device, other electronic devices, etc. In an embodiment, as shown in FIG. 35, the electronic device 1000 may be implemented as a smart phone. However, the electronic device 1000 is not limited thereto. For another example, the electronic device 1000 may be implemented as a cellular phone, a video phone, a smart pad, a smart watch, a tablet PC, a car navigation system, a computer monitor, a laptop, a head mounted display ("HMD") device, etc.

The processor 1010 may perform various computing functions. The processor 1010 may be a micro processor, a central processing unit ("CPU"), an application processor ("AP"), etc. The processor 1010 may be coupled to other components via an address bus, a control bus, a data bus, etc. Further, the processor 1010 may be coupled to an extended bus such as a peripheral component interconnection ("PCI") bus.

The memory device 1020 may store data for operations of the electronic device 1000. In an embodiment, for example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc. and/or at least one volatile memory device such as a dynamic random access memory ("DRAM") device, a static random access memory ("SRAM") device, a mobile DRAM device, etc.

The storage device 1030 may include a solid state drive ("SSD") device, a hard disk drive ("HDD") device, a CD-ROM device, etc.

The I/O device 1040 may include an input device such as a keyboard, a keypad, a mouse device, a touch-pad, a touch-screen, etc., and an output device such as a printer, a speaker, etc. In some embodiments, the I/O device 1040 may include the display device 1060.

The power supply 1050 may provide power for operations of the electronic device 1000. In an embodiment, for example, the power supply 1050 may be a power management integrated circuit ("PMIC").

The display device 1060 may display an image corresponding to visual information of the electronic device 1000. In some embodiments, the display device 1060 may be an organic light emitting display device or a quantum dot light emitting display device, but is not limited thereto. The display device 1060 may be connected to other components through the buses or other communication links in another embodiment.

The present disclosure may be applied to a display device and an electronic device including the display device. In an embodiment, for example, the present disclosure may be applied to a digital television, a 3D television, a smart phone, a cellular phone, a personal computer ("PC"), a tablet PC, a virtual reality ("VR") device, a home appliance, a laptop, a personal digital assistant ("PDA"), a portable media player ("PMP"), a digital camera, a music player, a portable game console, a car navigation system, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A gate driver comprising:

a stage configured to generate a carry signal and to provide the carry signal to a next stage; and an output controller configured to receive the carry signal and an enable signal, to control a voltage of a first control node in the output controller based on both the carry signal and the enable signal, and to output a gate signal based on the voltage of the first control node, wherein the gate signal corresponds to the carry signal under a predetermined condition, wherein the output controller includes:

a second-first control transistor including a control electrode configured to receive the carry signal, a first electrode connected to a second electrode of a second-second control transistor or configured to receive a low voltage, and a second electrode connected to the first control node;

the second-second control transistor including a control electrode configured to receive the enable signal, a first electrode configured to receive the low voltage, and the second electrode connected to the first electrode of the second-first control transistor or connected to the first control node;

a third control transistor including a control electrode connected to the first control node, a first electrode configured to receive a high voltage, and a second electrode connected to a second control node, through which the gate signal is output; and a fourth control transistor including a control electrode connected to the first control node, a first electrode configured to receive the low voltage, and a second electrode connected to the second control node.

2. The gate driver of claim 1, wherein the output controller is configured to output the gate signal, which corresponds to the carry signal, when the enable signal has an activation level and to output the gate signal, which has an inactivation level, when the enable signal has the inactivation level.

3. The gate driver of claim 1, wherein the output controller further includes:

a first-first control transistor including a control electrode configured to receive the carry signal, a first electrode configured to receive the high voltage, and a second electrode connected to the first control node; and a first-second control transistor including a control electrode configured to receive the enable signal, a first electrode configured to receive the high voltage, and a second electrode connected to the first control node.

4. The gate driver of claim 1, wherein the output controller further includes:

a first-first control transistor including a control electrode configured to receive the enable signal, a first electrode configured to receive the high voltage, and a second electrode connected to a first electrode of a first-second control transistor; and the first-second control transistor including a control electrode configured to receive the carry signal, the first electrode connected to the second electrode of the first-first control transistor, and a second electrode connected to the first control node.

5. The gate driver of claim 1, further comprising:

a buffer configured to receive and output the gate signal.

6. The gate driver of claim 1, wherein the stage includes:

a first stage transistor including a control electrode configured to receive a first clock signal, a first electrode configured to receive an input signal, and a second electrode connected to a first stage node;

a second stage transistor including a control electrode connected to a second stage node, a first electrode configured to receive a high voltage, and a second electrode connected to a third stage node;

a third stage transistor including a control electrode connected to a fourth stage node, a first electrode configured to receive a second clock signal, and a second electrode connected to the third stage node;

a fourth stage transistor including a control electrode connected to the first stage node, a first electrode configured to receive the first clock signal, and a second electrode connected to the second stage node;

a fifth stage transistor including a control electrode configured to receive the first clock signal, a first electrode configured to receive a low voltage, and a second electrode connected to the second stage node;

a sixth stage transistor including a control electrode configured to receive the second clock signal, a first electrode connected to a fifth stage node, and a second electrode connected to a sixth stage node;

a seventh stage transistor including a control electrode connected to a seventh stage node, a first electrode configured to receive the second clock signal, and a second electrode connected to the fifth stage node;

an eighth stage transistor including a control electrode connected to the first stage node, a first electrode configured to receive the high voltage, and a second electrode connected to the sixth stage node;

a ninth stage transistor including a control electrode connected to the sixth stage node, a first electrode configured to receive the high voltage, and a second electrode connected to an eighth stage node, through which the carry signal is output;

a tenth stage transistor including a control electrode connected to a ninth stage node, a first electrode configured to receive the low voltage, and a second electrode connected to the eighth stage node;

an eleventh stage transistor including a control electrode configured to receive the low voltage, a first electrode connected to the second stage node, and a second electrode connected to the seventh stage node;

a twelfth stage transistor including a control electrode configured to receive the low voltage, a first electrode connected to the first stage node, and a second electrode connected to the ninth stage node;

a first stage capacitor including a first electrode configured to receive the high voltage and a second electrode connected to the sixth stage node;

a second stage capacitor including a first electrode connected to the seventh stage node and a second electrode connected to the fifth stage node; and a third stage capacitor including a first electrode connected to the fourth stage node and a second electrode connected to the third stage node.

7. The gate driver of claim 1, wherein the stage includes:

a first stage transistor including a control electrode configured to receive a first clock signal, a first electrode configured to receive an input signal, and a second electrode connected to a first stage node;

a second stage transistor including a control electrode connected to a second stage node, a first electrode configured to receive a high voltage, and a second electrode connected to a second electrode of a third stage transistor;

the third stage transistor including a control electrode configured to receive a second clock signal, a first electrode connected to the first stage node, and the second electrode connected to the second electrode of the second stage transistor;

a fourth stage transistor including a control electrode connected to the first stage node, a first electrode configured to receive the first clock signal, and a second electrode connected to the second stage node;

a fifth stage transistor including a control electrode configured to receive the first clock signal, a first electrode configured to receive a low voltage, and a second electrode connected to the second stage node;

a sixth stage transistor including a control electrode connected to the second stage node, a first electrode configured to receive the high voltage, and a second electrode connected to a third stage node, through which the carry signal is output;

a seventh stage transistor including a control electrode connected to a fourth stage node, a first electrode configured to receive the second clock signal, and a second electrode connected to the third stage node;

an eighth stage transistor including a control electrode configured to receive the low voltage, a first electrode connected to the first stage node, and a second electrode connected to the fourth stage node;

a first stage capacitor including a first electrode configured to receive the high voltage and a second electrode connected to the second stage node; and a second stage capacitor including a first electrode connected to the fourth stage node and a second electrode connected to the third stage node.

8. The gate driver of claim 1, wherein the stage includes:

a first stage transistor including a control electrode configured to receive a first clock signal, a first electrode configured to receive an input signal, and a second electrode connected to a first stage node;

a second stage transistor including a control electrode connected to a second stage node, a first electrode configured to receive a second clock signal, and a second electrode connected to a first electrode of a third stage capacitor;

a third stage transistor including a control electrode configured to receive the first clock signal, a first electrode configured to receive a low voltage, and a second electrode connected to a third stage node;

a fourth stage transistor including a control electrode configured to receive the low voltage, a first electrode connected to the third stage node, and a second electrode connected to a fourth stage node;

a fifth stage transistor including a control electrode connected to the second stage node, a first electrode configured to receive the first clock signal, and a second electrode connected to the third stage node;

a sixth stage transistor including a control electrode connected to the fourth stage node, a first electrode configured to receive the second clock signal, and a second electrode connected to a first electrode of a seventh stage transistor;

the seventh stage transistor including a control electrode connected to the fourth stage node, the first electrode connected to the second electrode of the sixth stage transistor, and a second electrode connected to a fifth stage node;

an eighth stage transistor including a control electrode configured to receive the second clock signal, a first electrode connected to the fifth stage node, and a second electrode connected to a sixth stage node;

a ninth stage transistor including a control electrode connected to the sixth stage node, a first electrode configured to receive the first clock signal, and a second electrode connected to a seventh stage node, through which the carry signal is output;

a tenth stage transistor including a control electrode connected to the second stage node, a first electrode configured to receive the low voltage, and a second electrode connected to the seventh stage node;

an eleventh stage transistor including a control electrode configured to receive the low voltage, a first electrode connected to the first stage node, and a second electrode connected to the second stage node;

a first stage capacitor including a first electrode configured to receive the first clock signal and a second electrode connected to the sixth stage node;

a second stage capacitor including a first electrode connected to the fourth stage node and a second electrode connected to the fifth stage node; and the third stage capacitor including the first electrode connected to the second electrode of the second stage transistor and a second electrode connected to the second stage node.

9. A display device comprising:

a display panel including pixels;

a data driver configured to provide data voltages to the pixels;

a gate driver including stages and output controllers; and a timing controller configured to control the data driver and the gate driver, wherein each of the stages is configured to generate a carry signal and to provide the carry signal to a next stage, and wherein each of the output controllers is configured to receive the carry signal and an enable signal, to control a voltage of a first control node in the output controller based on the carry signal, and to output a gate signal to at least one of the pixels based on the voltage of the first control node or both the voltage of the first control node and the enable signal, wherein the gate signal corresponds to the carry signal under a predetermined condition, wherein each of the output controllers includes:

a first control transistor including a control electrode configured to receive the carry signal, a first electrode configured to receive a high voltage, and a second electrode connected to the first control node;

a second control transistor including a control electrode configured to receive the carry signal, a first electrode configured to receive a low voltage, and a second electrode connected to the first control node;

a fourth-first control transistor including a control electrode connected to the first control node, a first electrode configured to receive the low voltage or connected to a second electrode of a fourth-second control transistor, and a second electrode connected to a second control node, through which the gate signal is output; and the fourth-second control transistor including a control electrode configured to receive the enable signal, a first electrode configured to receive the low voltage, and a second electrode connected to the second control node or connected to the first electrode of the fourth-first control transistor.

10. The display device of claim 9, wherein the timing controller is configured to control a driving frequency of a portion of the display panel by controlling the enable signal applied to each of the output controllers, which is configured to output the gate signal to the portion of the display panel.

11. The display device of claim 9, wherein each of the output controllers is configured to output the gate signal, which corresponds to the carry signal, when the enable signal has an activation level and to output the gate signal, which has an inactivation level, when the enable signal has the inactivation level.

12. The display device of claim 9, wherein each of the output controllers further includes:

a third-first control transistor including a control electrode configured to receive the enable signal, a first electrode configured to receive the high voltage, and a second electrode connected to a first electrode of a third-second control transistor; and the third-second control transistor including a control electrode connected to the first control node, the first electrode connected to the second electrode of the third-first control transistor, and a second electrode connected to the second control node.

13. The display device of claim 9, wherein each of the output controllers further includes:

a third-first control transistor including a control electrode connected to the first control node, a first electrode configured to receive the high voltage, and a second electrode connected to the second control node; and a third-second control transistor including a control electrode configured to receive the enable signal, a first electrode configured to receive the high voltage, and a second electrode connected to the second control node.

14. The display device of claim 9, wherein the gate driver further includes a buffer configured to receive and output the gate signal.

15. The display device of claim 9, wherein at least one of the stages includes:

a first stage transistor including a control electrode configured to receive a first clock signal, a first electrode configured to receive an input signal, and a second electrode connected to a first stage node;

a second stage transistor including a control electrode connected to a second stage node, a first electrode configured to receive a high voltage, and a second electrode connected to a third stage node;

a third stage transistor including a control electrode connected to a fourth stage node, a first electrode configured to receive a second clock signal, and a second electrode connected to the third stage node;

a fourth stage transistor including a control electrode connected to the first stage node, a first electrode configured to receive the first clock signal, and a second electrode connected to the second stage node;

a fifth stage transistor including a control electrode configured to receive the first clock signal, a first electrode configured to receive a low voltage, and a second electrode connected to the second stage node;

a sixth stage transistor including a control electrode configured to receive the second clock signal, a first electrode connected to a fifth stage node, and a second electrode connected to a sixth stage node;

a seventh stage transistor including a control electrode connected to a seventh stage node, a first electrode configured to receive the second clock signal, and a second electrode connected to the fifth stage node;

an eighth stage transistor including a control electrode connected to the first stage node, a first electrode configured to receive the high voltage, and a second electrode connected to the sixth stage node;

a ninth stage transistor including a control electrode connected to the sixth stage node, a first electrode configured to receive the high voltage, and a second electrode connected to an eighth stage node, through which the carry signal is output;

a tenth stage transistor including a control electrode connected to a ninth stage node, a first electrode configured to receive the low voltage, and a second electrode connected to the eighth stage node;

an eleventh stage transistor including a control electrode configured to receive the low voltage, a first electrode connected to the second stage node, and a second electrode connected to the seventh stage node;

a twelfth stage transistor including a control electrode configured to receive the low voltage, a first electrode connected to the first stage node, and a second electrode connected to the ninth stage node;

a first stage capacitor including a first electrode configured to receive the high voltage and a second electrode connected to the sixth stage node;

a second stage capacitor including a first electrode connected to the seventh stage node and a second electrode connected to the fifth stage node; and a third stage capacitor including a first electrode connected to the fourth stage node and a second electrode connected to the third stage node.

16. The display device of claim 9, wherein at least one of the stages includes:

a first stage transistor including a control electrode configured to receive a first clock signal, a first electrode configured to receive an input signal, and a second electrode connected to a first stage node;

a second stage transistor including a control electrode connected to a second stage node, a first electrode configured to receive a high voltage, and a second electrode connected to a second electrode of a third stage transistor;

the third stage transistor including a control electrode configured to receive a second clock signal, a first electrode connected to the first stage node, and the second electrode connected to the second electrode of the second stage transistor;

a fourth stage transistor including a control electrode connected to the first stage node, a first electrode configured to receive the first clock signal, and a second electrode connected to the second stage node;

a fifth stage transistor including a control electrode configured to receive the first clock signal, a first electrode configured to receive a low voltage, and a second electrode connected to the second stage node;

a sixth stage transistor including a control electrode connected to the second stage node, a first electrode configured to receive the high voltage, and a second electrode connected to a third stage node, through which the carry signal is output;

a seventh stage transistor including a control electrode connected to a fourth stage node, a first electrode configured to receive the second clock signal, and a second electrode connected to the third stage node;

an eighth stage transistor including a control electrode configured to receive the low voltage, a first electrode connected to the first stage node, and a second electrode connected to the fourth stage node;

a first stage capacitor including a first electrode configured to receive the high voltage and a second electrode connected to the second stage node; and a second stage capacitor including a first electrode connected to the fourth stage node and a second electrode connected to the third stage node.

* * * * *